(12) United States Patent
Kramer et al.

(10) Patent No.: US 11,776,781 B2
(45) Date of Patent: Oct. 3, 2023

(54) VARIABLE CONTROL SWITCH

(71) Applicants: Eric W. Kramer, Laguna Beach, CA (US); Christopher D Compton, St. Petersburg, FL (US)

(72) Inventors: Eric W. Kramer, Laguna Beach, CA (US); Christopher D Compton, St. Petersburg, FL (US)

(*) Notice: Subject to any disclaimer, the term of this patent is extended or adjusted under 35 U.S.C. 154(b) by 73 days.

(21) Appl. No.: 16/407,120

(22) Filed: May 8, 2019

(65) Prior Publication Data
US 2019/0348241 A1    Nov. 14, 2019

Related U.S. Application Data

(60) Provisional application No. 62/762,528, filed on May 8, 2018.

(51) Int. Cl.
*H01H 47/18* (2006.01)
*H02H 1/00* (2006.01)
*H02H 9/02* (2006.01)

(52) U.S. Cl.
CPC .......... *H01H 47/18* (2013.01); *H02H 1/0007* (2013.01); *H02H 9/02* (2013.01)

(58) Field of Classification Search
CPC .... H01H 47/18; H01H 47/002; H02H 1/0007; H02H 9/02; H02H 9/001; H02H 3/08
USPC ........................................................ 307/141
See application file for complete search history.

(56) References Cited

U.S. PATENT DOCUMENTS

| | | | | | |
|---|---|---|---|---|---|
| 4,298,114 | A  * | 11/1981 | Nagai   | ................... | B30B 15/148 192/129 A |
| 5,272,585 | A  * | 12/1993 | Gibbs   | ................... | H02H 3/006 361/64 |
| 5,731,947 | A  * | 3/1998  | Hirose  | ................. | H01R 25/003 361/160 |
| 6,892,115 | B2 * | 5/2005  | Berkcan | ................... | H02H 7/30 361/60 |
| 7,341,481 | B2 * | 3/2008  | Spiri   | ..................... | H02H 9/001 439/535 |
| 7,496,460 | B2 * | 2/2009  | Hornick | ................ | H02J 7/0063 702/64 |
| 7,830,041 | B2 * | 11/2010 | Yang    | .................... | H01R 31/065 307/115 |

(Continued)

FOREIGN PATENT DOCUMENTS

CN        2120395 U    * 10/1992

OTHER PUBLICATIONS

Jeelabs, "Sensing with an Optocoupler," 2012, pp. 1-6 (Year: 2012).*

*Primary Examiner* — Alfonso Perez Borroto

(74) *Attorney, Agent, or Firm* — Gordon E. Gray, III; GRAY LAW FIRM

(57) ABSTRACT

The present invention is a variable control switch. In particular, it is a control switch with modifiable variables for activation and deactivation of primary and secondary devices. The control switch has an input plug and two output plugs. The control switch has a sensing circuit connected between the input plug and two output plugs and has an output comprising DC voltage varying proportionally to the current passing between said first and second output plugs. The sensing circuit is connected to a microcontroller unit that controls current to the first or second outputs based on a set of pre-determined variables, including a termination threshold.

4 Claims, 37 Drawing Sheets

(56) References Cited

U.S. PATENT DOCUMENTS

| | | | | |
|---|---|---|---|---|
| 7,964,994 B2* | 6/2011 | DuBose | | H02J 9/005 307/126 |
| 8,536,733 B2* | 9/2013 | Lee | | G06F 1/266 307/39 |
| 2002/0106945 A1* | 8/2002 | Wyatt | | H02H 3/08 439/894 |
| 2004/0024475 A1* | 2/2004 | Berkcan | | H04L 43/00 700/295 |
| 2004/0078463 A1* | 4/2004 | Pearlman | | G06F 1/12 709/224 |
| 2005/0052814 A1* | 3/2005 | McNally | | G06F 1/266 361/166 |
| 2005/0099257 A1* | 5/2005 | Holce | | H01H 71/123 336/90 |
| 2005/0280970 A1* | 12/2005 | Reynolds | | H02H 3/08 361/93.1 |
| 2006/0273663 A1* | 12/2006 | Emalfarb | | H02H 3/12 307/126 |
| 2007/0135971 A1* | 6/2007 | Andarawis | | H02J 3/007 700/292 |
| 2008/0291594 A1* | 11/2008 | Brattel | | H05B 45/50 361/86 |
| 2010/0194198 A1* | 8/2010 | Djenguerian | | H02M 3/33507 307/31 |
| 2010/0314949 A1* | 12/2010 | DuBose | | H02J 9/005 307/117 |
| 2011/0031819 A1* | 2/2011 | Gunwall | | H01H 43/04 307/141.4 |
| 2011/0181114 A1* | 7/2011 | Hodges | | H02J 9/005 307/39 |
| 2011/0221271 A1* | 9/2011 | Bodnar | | G06F 1/266 307/31 |
| 2011/0266870 A1* | 11/2011 | Hu | | H01R 13/6683 307/39 |
| 2011/0291641 A1* | 12/2011 | Nanayakkara | | G01R 15/22 324/126 |
| 2012/0086272 A1* | 4/2012 | Chen | | H02H 3/027 307/38 |
| 2012/0313454 A1* | 12/2012 | Montena | | G06F 1/26 307/115 |
| 2013/0294014 A1* | 11/2013 | Irons | | H02B 7/00 335/2 |
| 2014/0240879 A1* | 8/2014 | Johnson, Jr. | | H02H 9/004 361/58 |
| 2015/0130330 A1* | 5/2015 | Nagy | | H01H 51/27 310/68 C |
| 2016/0156227 A1* | 6/2016 | Nagashima | | G01R 21/00 307/131 |
| 2016/0225562 A1* | 8/2016 | Franks | | H02H 3/08 |
| 2020/0403398 A1* | 12/2020 | Logan | | H02H 7/26 |

* cited by examiner

100

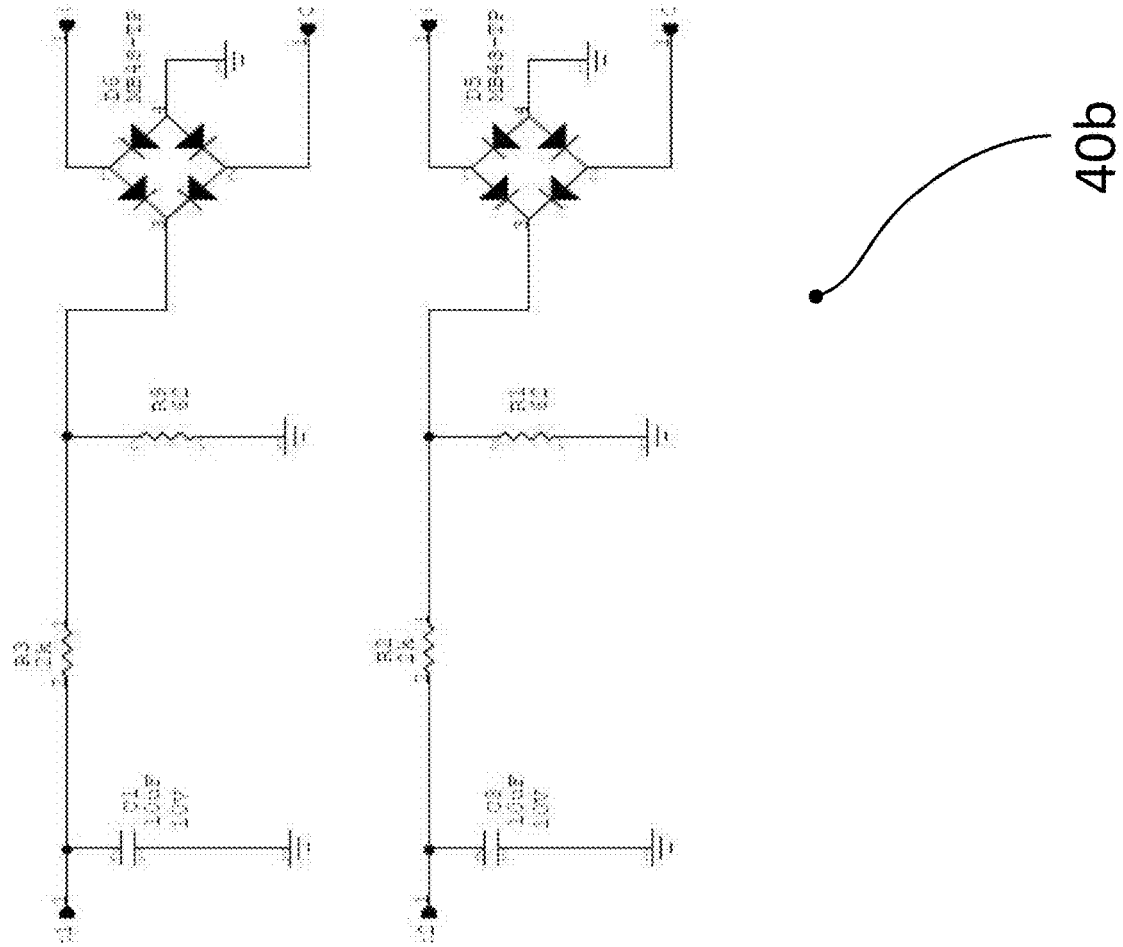
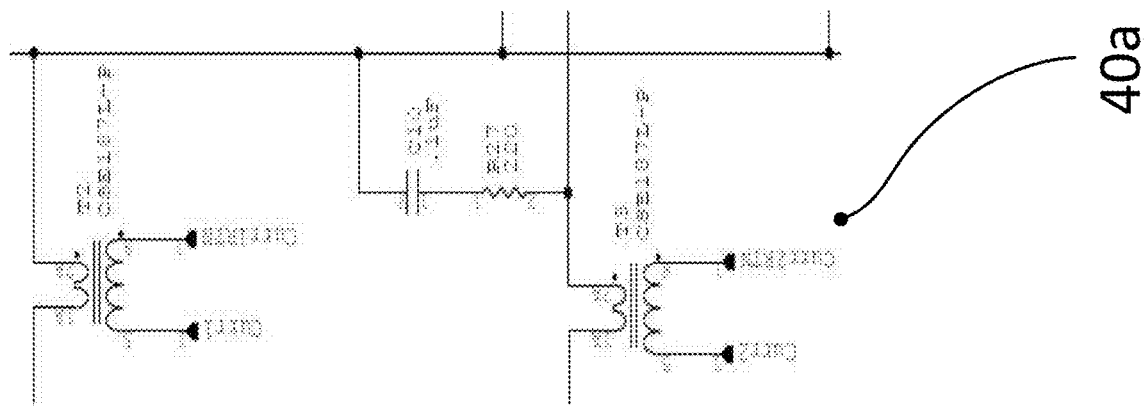
FIG. 6

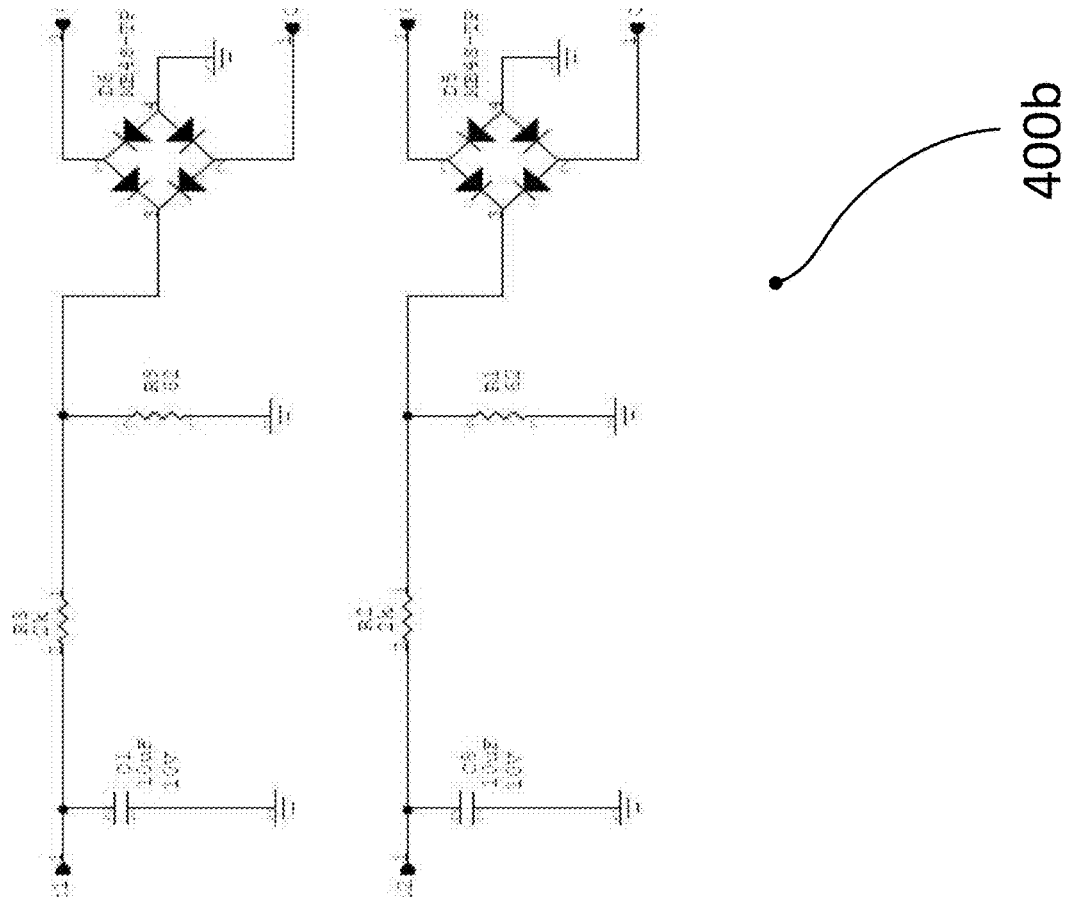
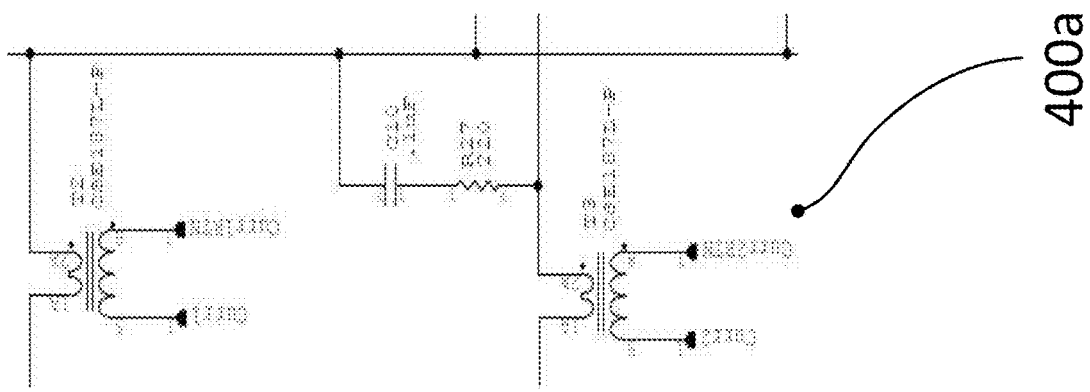
FIG. 12

VARIABLE CONTROL SWITCH

TECHNICAL FIELD

The present invention is a variable control switch, in particular, a control switch with modifiable variables for activation and deactivation. This application claims priority from U.S. Provisional Pat. Appl. No. 62/762,528, which is included by reference in its entirety.

BACKGROUND ART

Woodshops, job sites, and machine shops, as well as other shops and locations, often operate multiple devices on the same circuit and circuit breaker. For example, power tools are often used in conjunction with a wet/dry vacuum for ventilation and dust-control purposes. However, these devices often start with significant current spikes that, if both devices are activated close in time, can trip the circuit breaker and cause the power to be cut off to both devices. Thus, power controller circuits, such as that disclosed in U.S. Pat. No. 7,341,481, are used to regulate current to both devices to prevent tripping the common circuit breaker. However, these power controller circuits can be imprecise or lack fine control for the variety of devices and situations that can occur in a given work environment. Thus, a switch that is more flexible for a variety of situations and variables is needed.

SUMMARY OF THE INVENTION

The present invention is a variable control switch. In particular, it is a control switch with modifiable variables for activation and deactivation of primary and secondary devices. The control switch has an input plug and two output plugs. The control switch has a sensing circuit connected between the input plug and two output plugs and has an output comprising DC voltage varying proportionally to the current passing between said first and second output plugs. The sensing circuit is connected to a microcontroller unit that controls current to the first or second outputs based on a set of pre-determined variables, including a termination threshold.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 6 is a preferred embodiment of a portion of the circuit from FIG. 2 showing the current sensing sections of the circuit;

FIG. 12 is a preferred embodiment of a portion of the circuit from FIG. 15 showing the current sensing sections of the circuit;

DETAILED DESCRIPTION OF THE PREFERRED EMBODIMENTS

Figure 1:
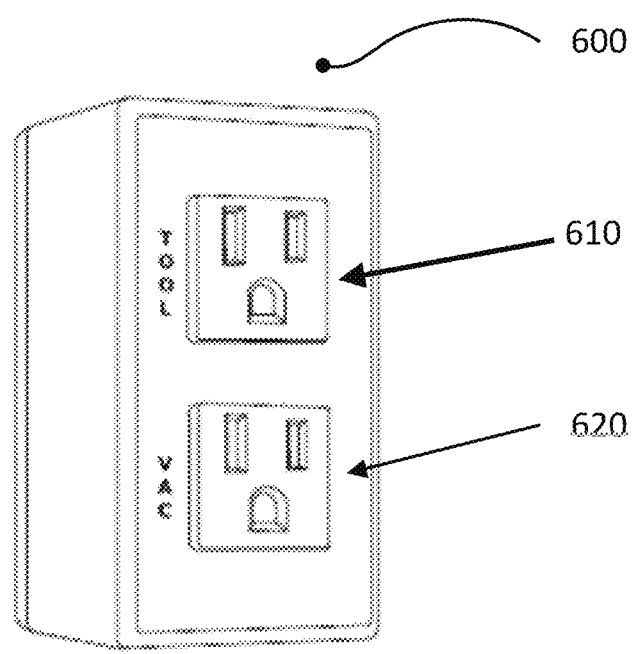
FIG. 1 is a perspective view of one embodiment of the invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s). The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a variable control switch.

Referring now to FIG. 1, a preferred embodiment of the invention is shown, namely a control switch that turns power on and off to a secondary device, e.g. a wet/dry vacuum or ventilation system, based on a variety of variables such as electrical current flowing to a primary device, e.g. a power tool. The embodiment shown in FIG. 1 is an external plug adapter 600 to plug into an AC outlet (not shown) with a primary output 610 and a second output 620. However, alternate embodiments can include a control switch embedded directly into primary devices, e.g. saws or other power tools, or secondary devices, e.g. wet/dry vacuums.

Figure 2:
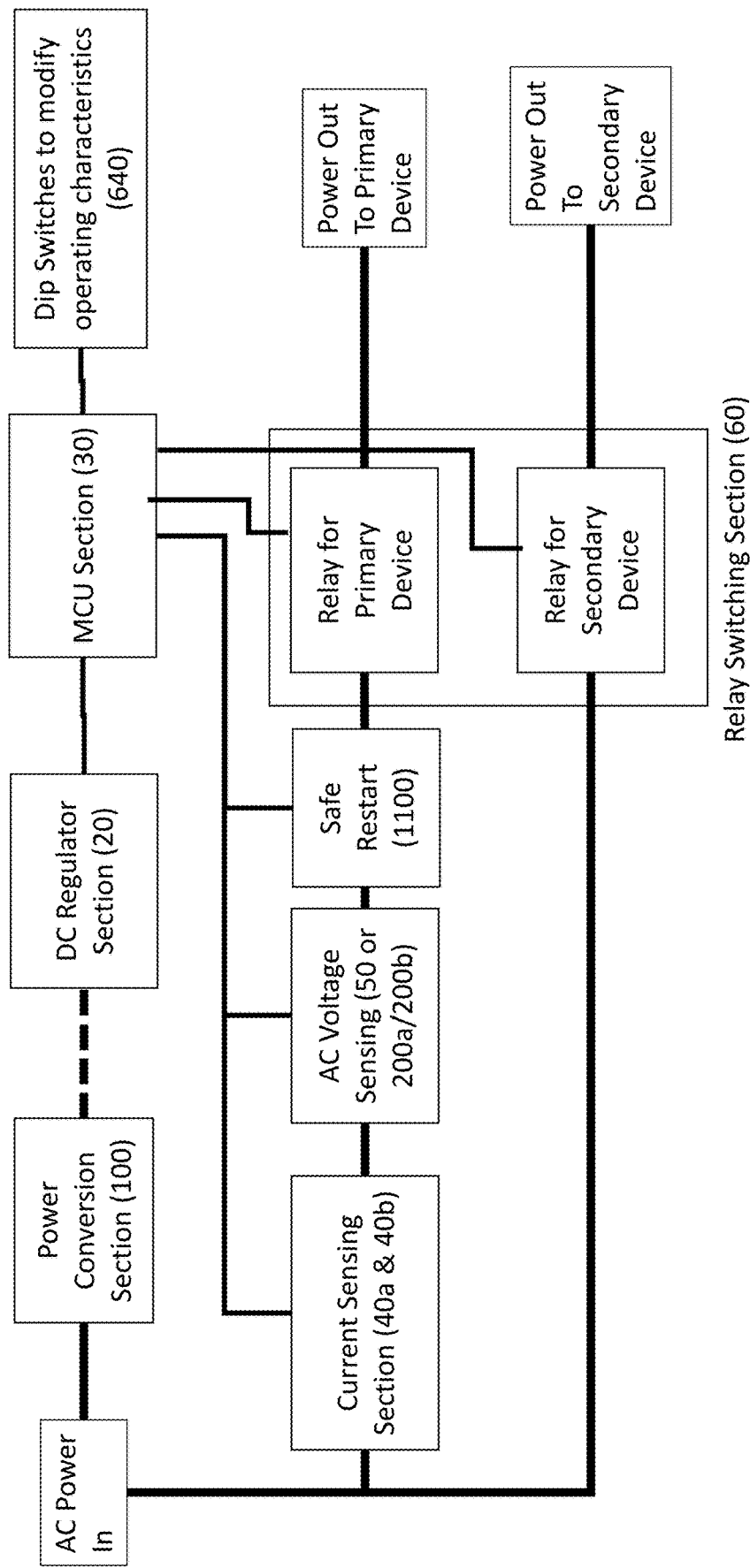
FIG. 2 is a block diagram schematic of a preferred embodiment of the invention.

Referring now to FIG. 2, a block diagram of a preferred embodiment of the invention for use with AC (alternating current) power supplies is shown. For reference purposes, the diagram shown in FIG. 2 can be broken down into various sections based on function.

Figure 3:
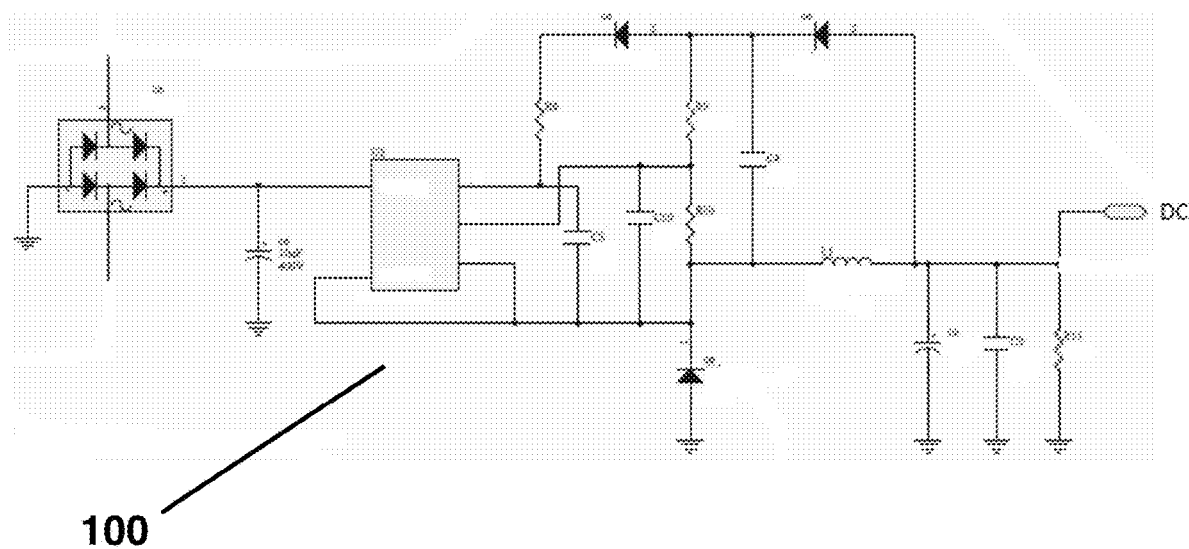
FIG. 3 is a preferred embodiment of a portion of the circuit from FIG. 2 or FIG. 15 showing the power conversion section of the circuit.

Referring now to FIG. 3, a preferred embodiment of the power conversion section 100 from FIG. 2 is shown. Typically, the AC line voltage enters the circuit and passes through a rectifier to create a high voltage DC. The high voltage DC is filtered by an input bulk capacitor. The high voltage DC feeds the input to a non-isolated buck regulator control IC. The buck regulator IC switches at a proportional duty cycle to generate a lower DC voltage, which is typically at a 10:1 ratio. The output voltage DC is regulated at a higher voltage for peripheral components within the system. This voltage is fed to DC regulator section 20.

Figure 4:
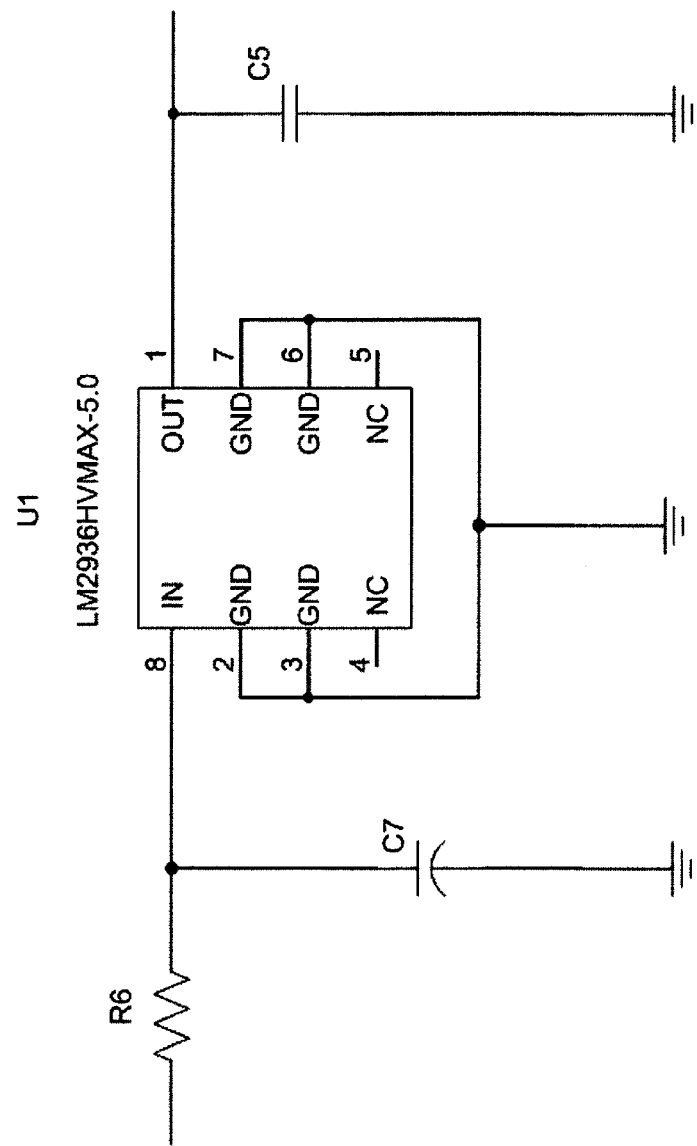
FIG. 4 is a preferred embodiment of a portion of the circuit from FIG. 2 showing the DC regulator section of the circuit.
Figure 9:
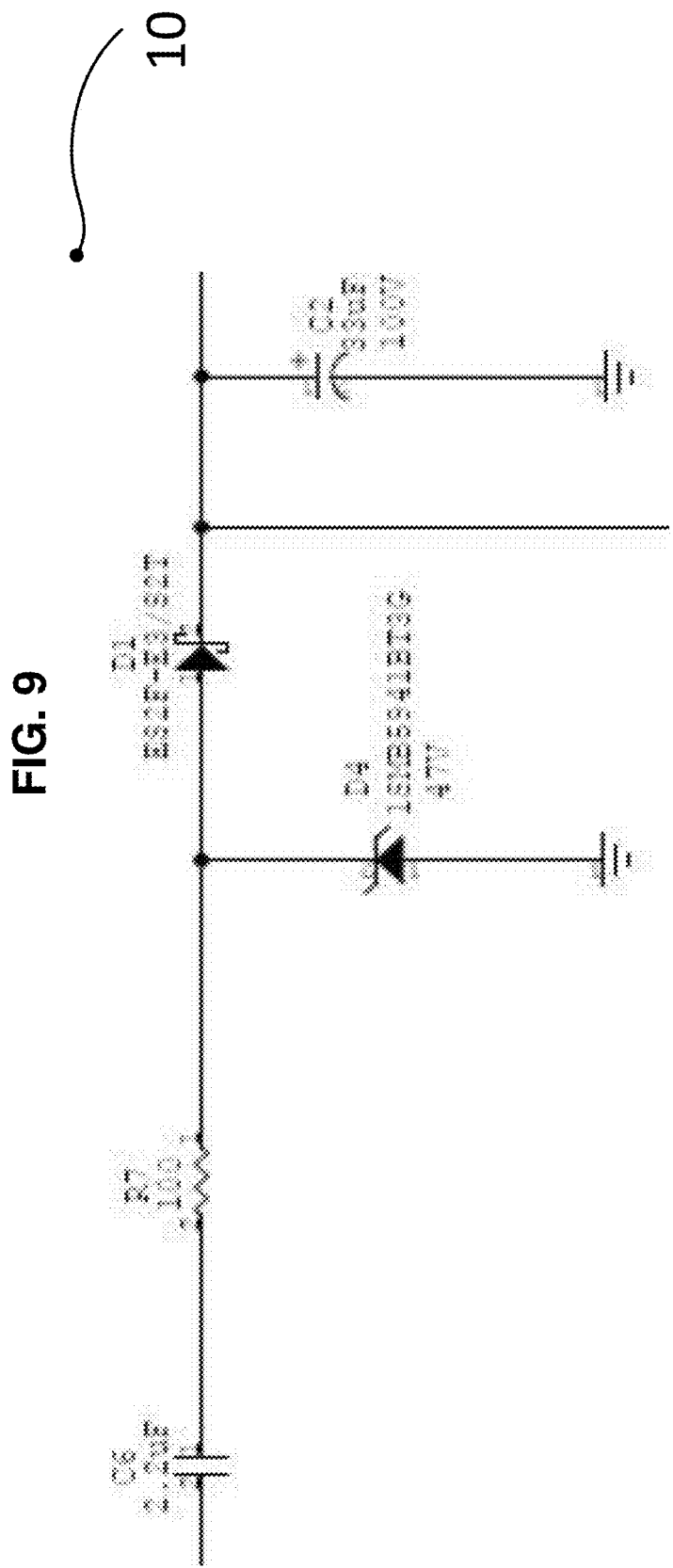
FIG. 9 is a preferred embodiment of a portion of the circuit from FIG. 2 showing the DC voltage section of the circuit.

Referring now to FIG. 4, a preferred embodiment of the DC (direct current) regulator section 20 of the diagram in FIG. 2 is shown. DC voltage fed from section 10 (shown in FIG. 9) passes through resistor R6 and is filtered before powering the linear regulator integrated circuit (IC) U1. This regulator U1 is preferably 36V input to fixed 5V output at 100 mA maximum load. The output from U1 is fed to MCU section 30.

Figure 5:
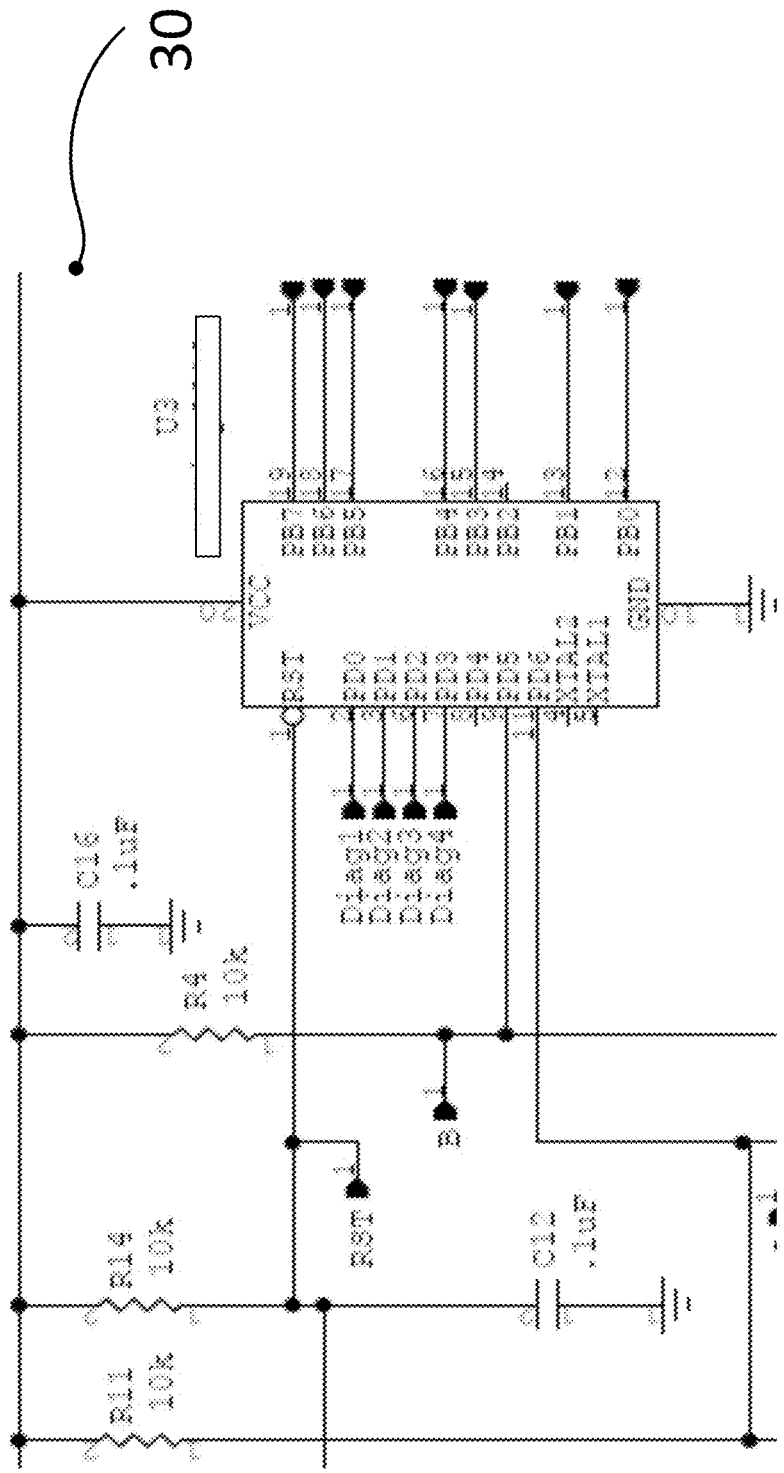
FIG. 5 is a preferred embodiment of a portion of the circuit from FIG. 2 showing the MCU section of the circuit.

Referring now to FIG. 5, a preferred embodiment of the MCU (microcontroller unit) section 30 of the diagram in FIG. 2 is shown. The DC regulator section 20 preferably has 5V to power the MCU. The MCU monitors three input logic level sensors from three switches with switch states. Each level is high or low depending upon the switch state. The switch state will give 2 sensing levels, depending upon the firmware for the MCU. The input sensing resolution is preferably 10 bits. The following preferred sensing levels are defined:

i) Relay bypass, closed=ON, open=OFF;
ii) Current High level, closed=0-30A, open=0-30A;
iii) Current Low level, closed=0-30A, open=0-30A;
iv) Current 1 level, 0-4V analog signal from section 40a; and,
v) Current 2 level, 0-4V analog signal from section 40b.

Referring now to FIG. 6, a preferred embodiment of the current sensing sections 40a and 40b from the diagram in FIG. 2 are shown. In section 40a, AC current passes through current transformers (CT) T2 and T3 and converts the equivalent primary current to the secondary output in section 40b. Current 1 and Current 2 are then fed to section 20 after signal filtering. Current 1 represents the equivalent current passing through the switch outlet Line 1 in section 40a. Current 2 represents the equivalent current passing through the switched outlet Line 2 in section 40a.

Figure 7:
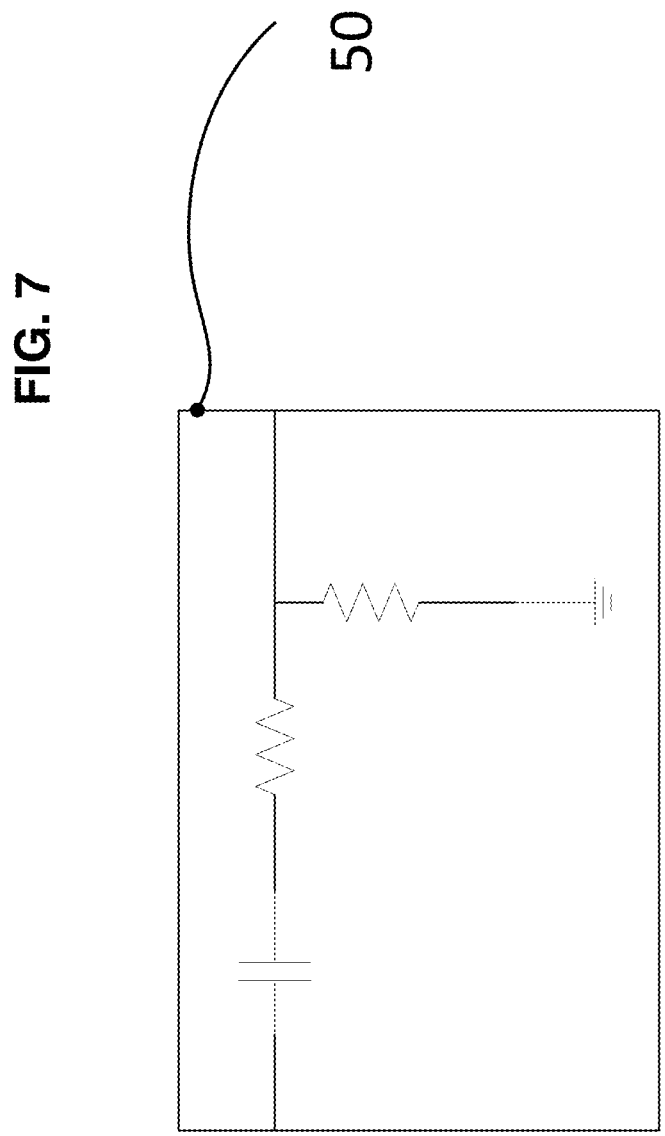
FIG. 7 is a preferred embodiment of a portion of the circuit from FIG. 2 showing the AC voltage sensing section of the circuit.

Referring now to FIG. 7, a preferred embodiment of the AC voltage-sensing section 50 from the diagram in FIG. 2 is shown. AC voltage is divided down to a lower level for the MCU in section 20 to read the equivalent AC voltage on the line. The AC voltage is coupled using a capacitive voltage divider circuit, similar to section 10. The MCU can preferably read a 0-4V level.

Figure 8:
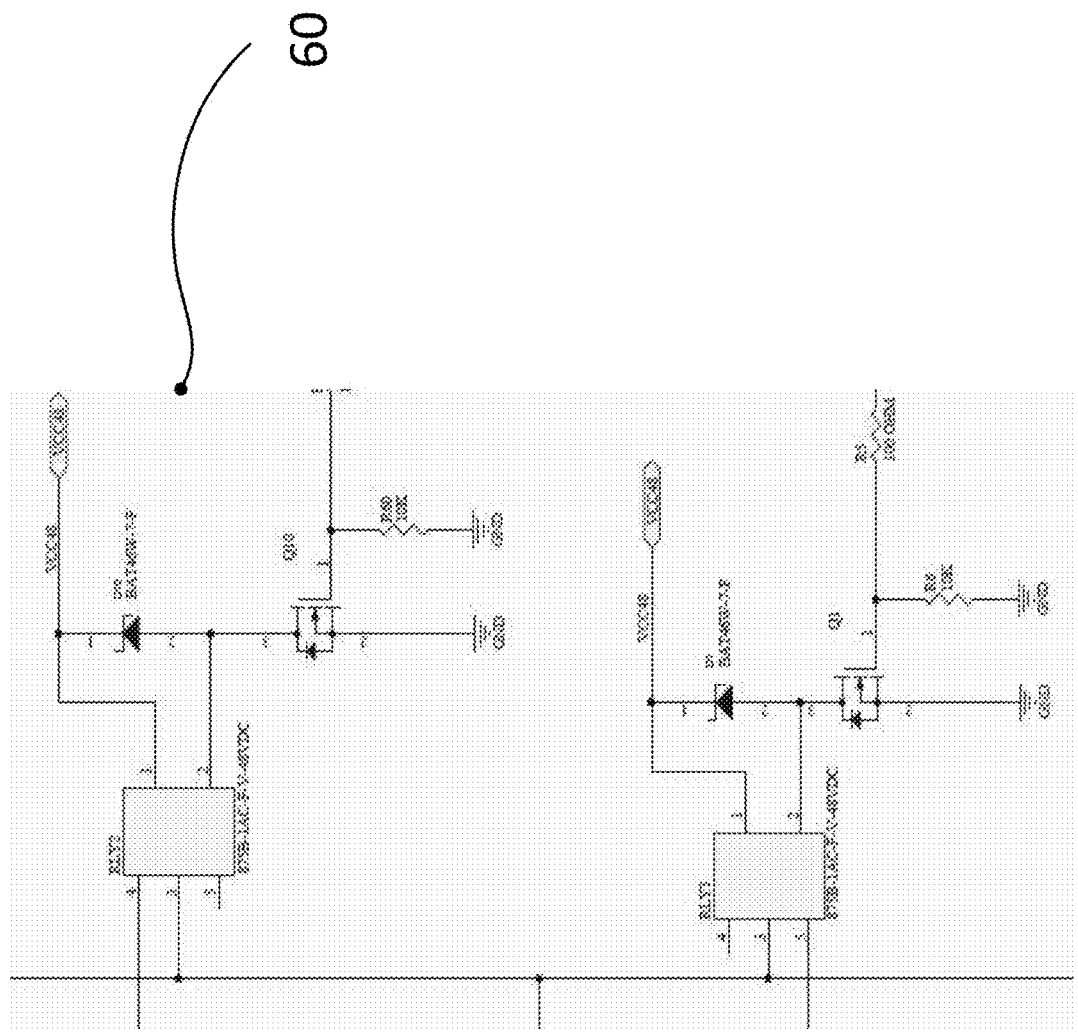
FIG. 8 is a preferred embodiment of a portion of the circuit from FIG. 2 showing the relay switching section of the circuit.

Referring now to FIG. 8, a preferred embodiment of the relay switching section 60 from the diagram in FIG. 2 is shown. RLY1 (or contact1) can disconnect the switched output Line1. RLY2 (or contact2) can disconnect the switched output Line2. RLY1 and RLY2 are controlled by MCU section 20. It should be noted that multiple relay or contact configurations are possible. For example, Single Pole Single Throw (SPST) or Single Pole Double Throw (SPDT), or other options such as DPST, DPDT and Solid State Relays are available. In general, the term "contact" or "relay" is used. Moreover, it is possible to use the present invention to actuate a 120 Vac Electro-Mechanical Relay to control a 208 Vac 3-Phase to use the device as an intelligent switch.

Figure 15:
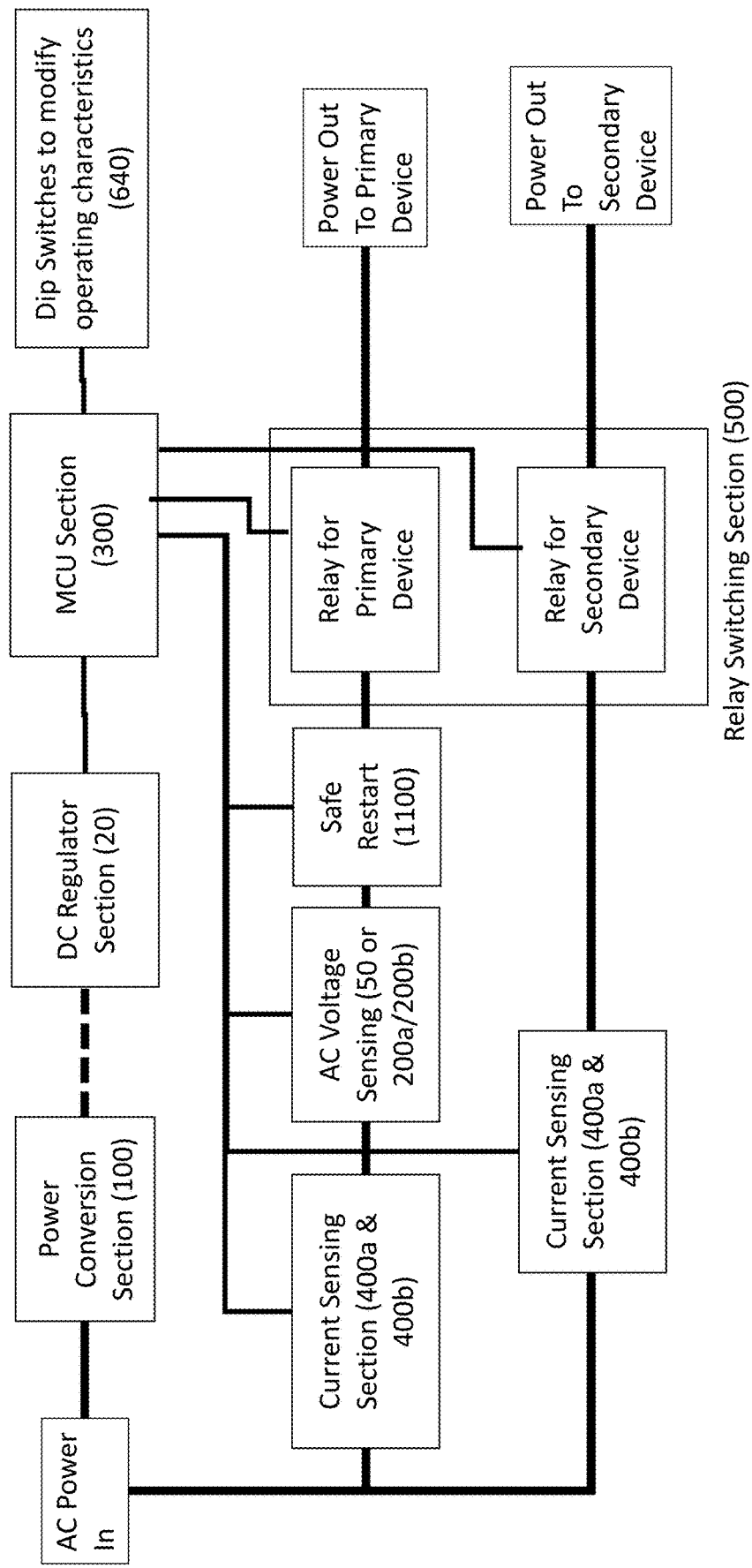
FIG. 15 is a block diagram schematic of an alternative embodiment of the present invention.

Referring now to FIG. 15, another embodiment of the invention is shown for use with a non-isolated high voltage Buck controller power supply. Preferably, the circuit operates with an output regulated 12V at 200 mA. Again, for reference purposes, the diagram shown in FIG. 15 can be broken down into various sections based on function. Referring back to FIG. 3, a preferred embodiment of the AC input isolated output section 100 is shown. AC line voltage enters the circuit and is rectified to a high voltage DC that is filtered and then switched at a high frequency using a PWM (pulse width modulation) signal.

Figure 10:
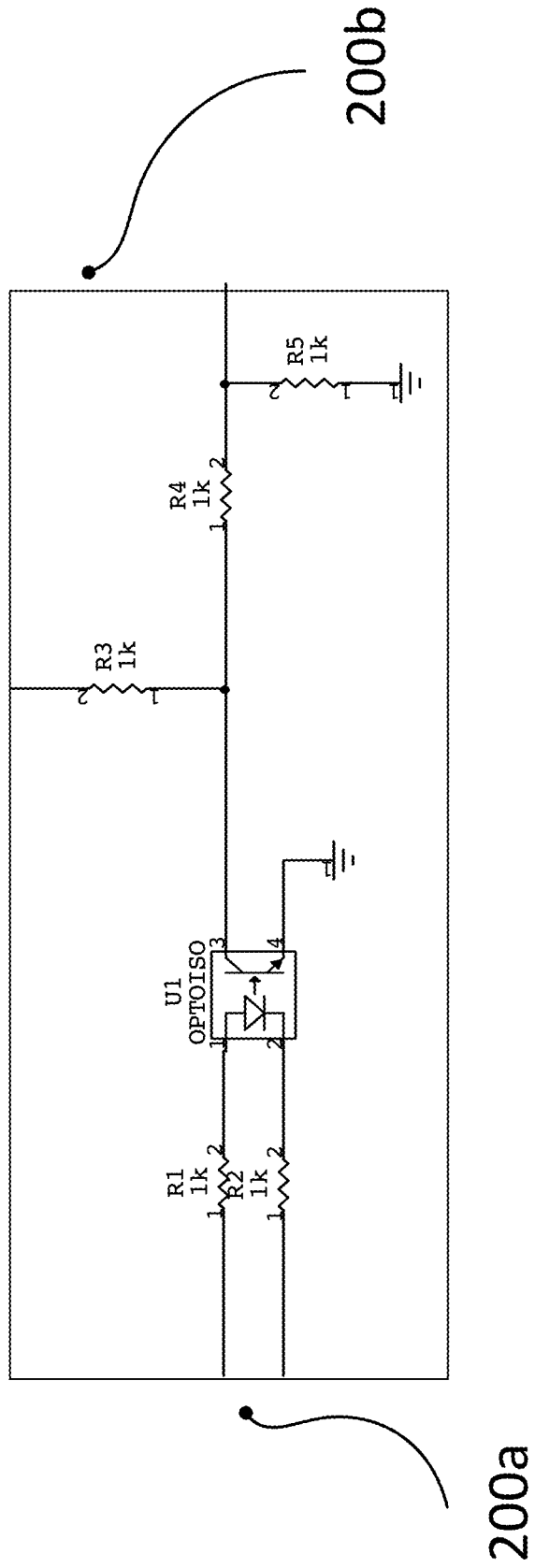
FIG. 10 is a preferred embodiment of a portion of the circuit from FIG. 15 showing the AC voltage sensing sections of the circuit.

Referring now to FIG. 10, a preferred embodiment of the AC voltage sensing sections 200a and 200b are shown from the diagram in FIG. 15. AC line voltage is preferably sensed through an optocoupler U1. This DC equivalent voltage is fed through the resistor divider circuitry in section 200b and then to the MCU section 300.

Figure 11:
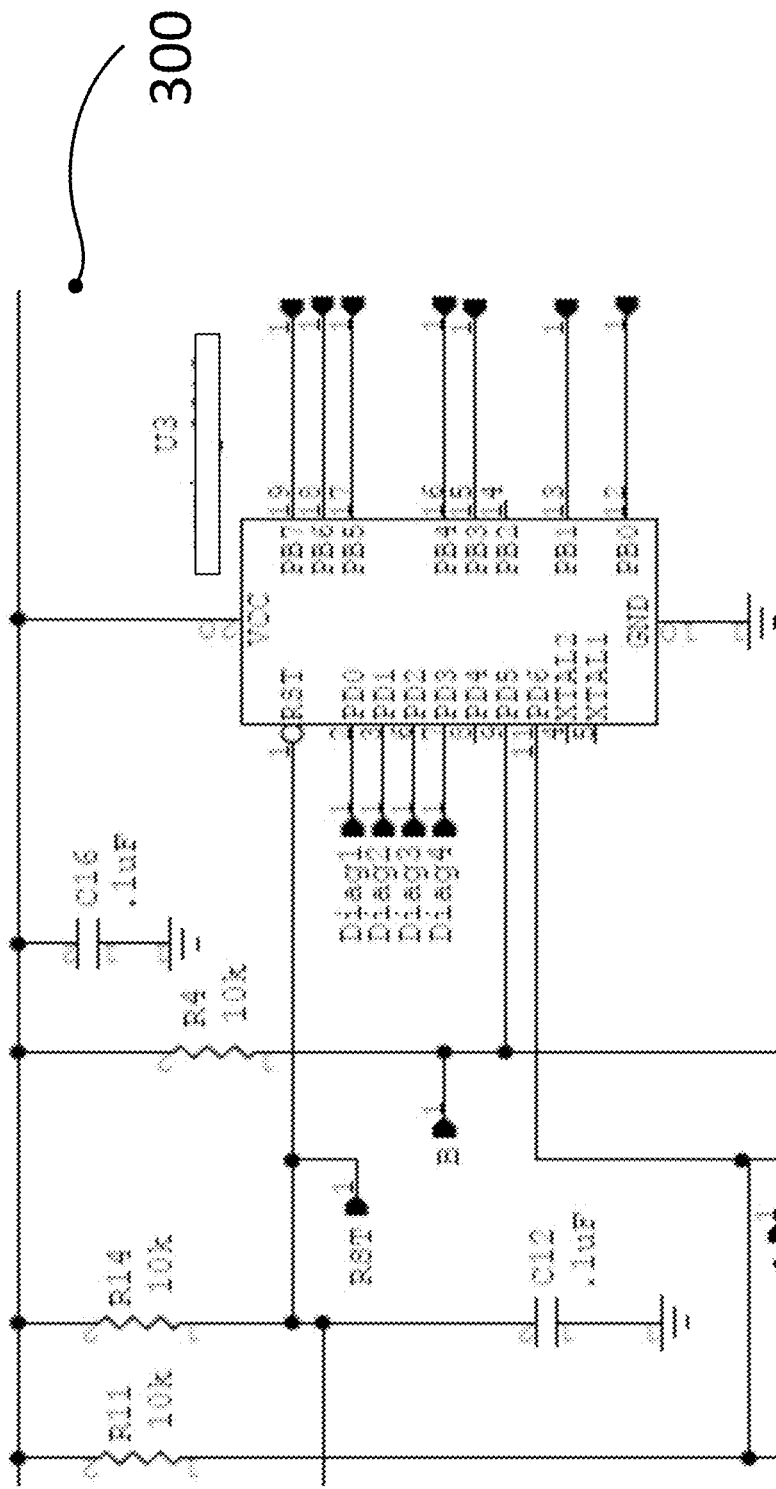
FIG. 11 is a preferred embodiment of a portion of the circuit from FIG. 15 showing the MCU section of the circuit.

Referring now to FIG. 11, a preferred embodiment of the MCU section 300 is shown from the diagram in FIG. 15. Section 100 powers the MCU section 300. The MCU monitors three input logic level sensors from three switches. The switch state will preferably give 2 sensing levels, depending upon the firmware for the MCU. The input sensing resolution is preferably 8 bits. The following sensing levels are defined as follows:

i) Relay bypass, closed=ON, open=OFF;
  ii) Current High level, closed=0-30 A, open=0-30 A;
  iii) Current Low level, closed=0-30 A, open=0-30 A;
  iv) Current 1 level, 0-4V analog signal from section 400b; and,
  v) Current 2 level, 0-4V analog signal from section 400b.

Referring now to FIG. 12, a preferred embodiment of the current sensing sections 400a and 400b are shown from the diagram in FIG. 15. AC current passes through CT's T1 and T2 and converts the equivalent primary current to the secondary output in section 400a. Current 1 and Current 2 are then fed to section 300 after signal filtering in section 400b. Current 1 represents the equivalent current passing through the switch outlet Line1 in section 400a. Current 2 represents the equivalent current passing through the switched outlet Line 2 in section 400a.

Figure 13:
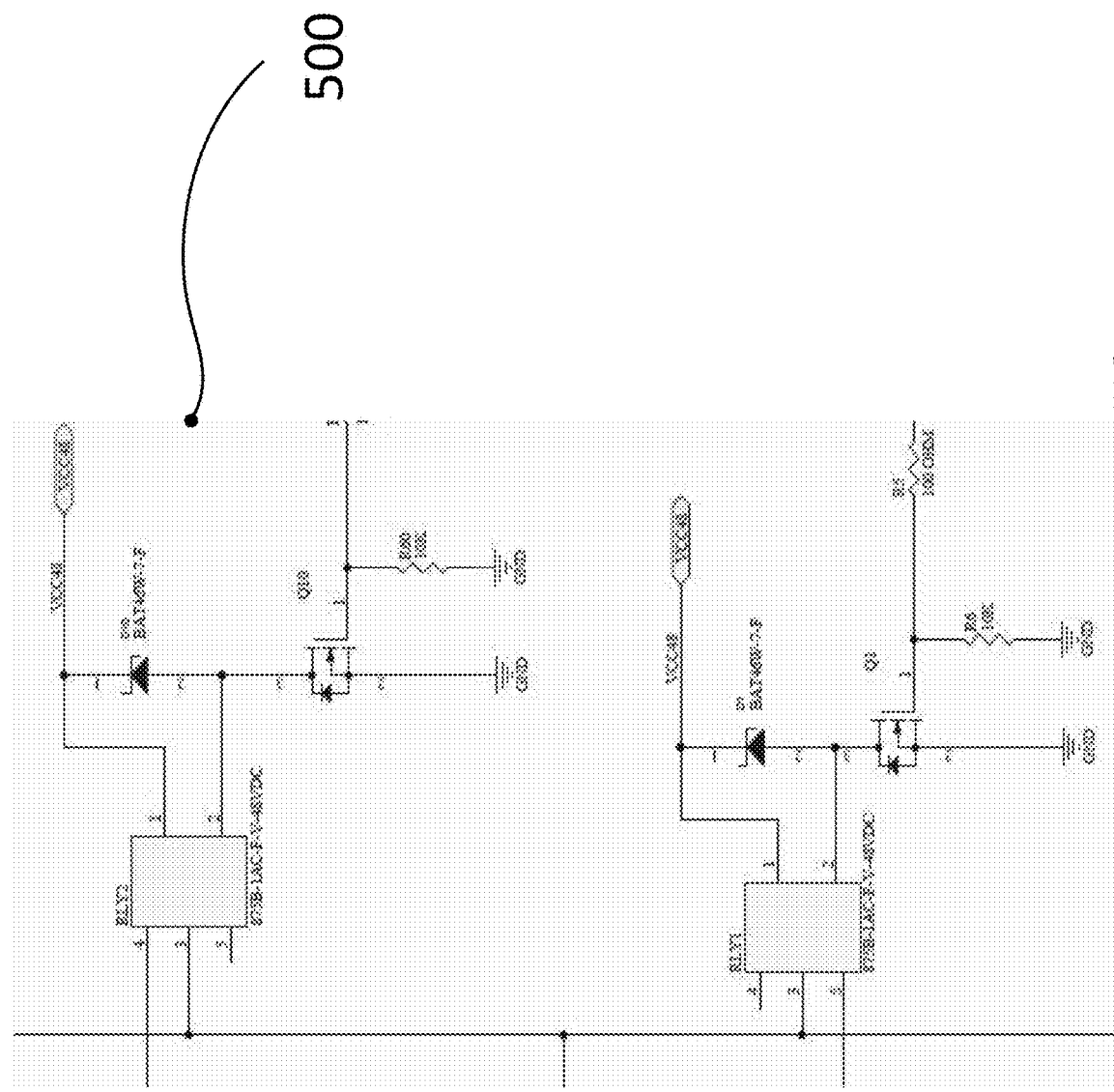
FIG. 13 is a preferred embodiment of a portion of the circuit from FIG. 15 showing the relay switching section of the circuit.

Referring now to FIG. 13, a preferred embodiment of the relay switching section 500 is shown from the diagram in FIG. 15. RLY1 disconnects the switched output Line 1. RLY2 disconnects the switched output Line 2. RLY1 and RLY2 are controlled by MCU section 200.

Accordingly, using the diagrammed embodiments shown in FIG. 2 or FIG. 15, a variable control switch, such as the embodiment shown in FIG. 1, can turn power on and off to a secondary device, e.g. a wet/dry vacuum or ventilation system, based on a variety of variables such as electrical current flowing to a primary device, e.g. a power tool. The preferred variables (monitored by the switch for powering on or shutting down the primary and secondary devices) controllable by the user are as follows:

a) Current draw from the secondary device;
  b) Actuation threshold of the primary device;
  c) Startup delay for the secondary device;
  d) Termination threshold for the primary device;
  e) Normal operating current of the secondary device;
  f) Overload delay for the secondary device;
  g) Restart delay for the secondary device;
  h) Shutoff delay for the secondary device; and,
  i) Combined (for both primary and secondary devices) current limit.

Figure 14:
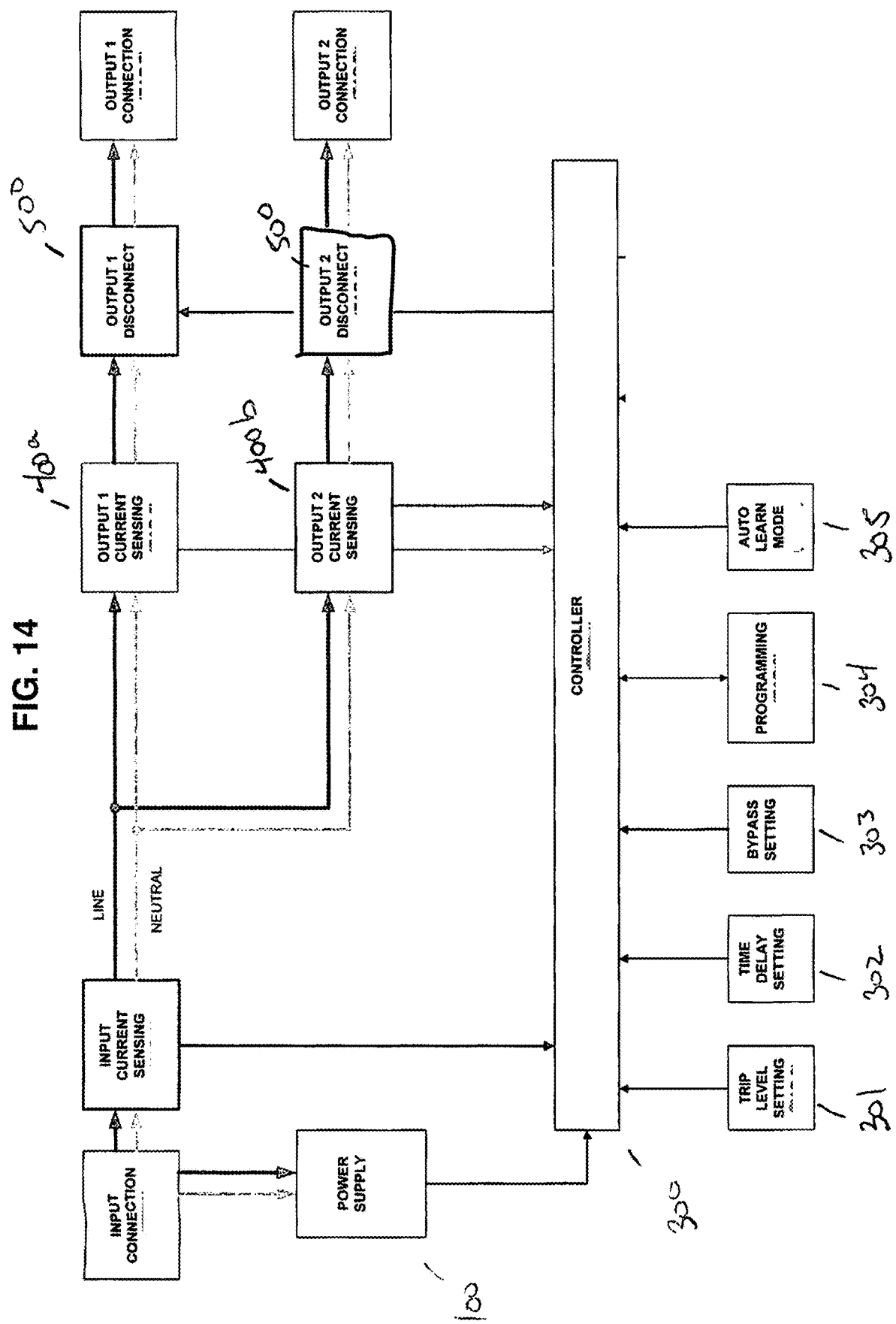
FIG. 14 is a schematic of a preferred embodiment of the present invention.

Referring now to FIG. 14, a schematic of a preferred embodiment of the invention using two relays is shown. In particular, controller 300 is preferably a microprocessor-based unit. Preferred microprocessors include Attiny13A, Attiny24A and Atmega128. The controller 300 preferably controls a variety of variables and/or functions. For example, the controller 300 preferably controls a trip level setting 301, e.g. a current level set by an open switch for one level and closed for another level (or software configurable). The controller 300 preferably controls a time delay setting 302, e.g. a delay time set by an open switch for one level and another level by a closed switch (or software configurable.) The controller 300 preferably controls a bypass setting 303, e.g. a bypass switch, preferably open for normal operation and closed for bypass of the controller 300 (or software configurable). The controller 300 preferably controls a programming mode 304, e.g. whereby the controller 300 enters programming mode (as described below) or receives data through a variety of connectors such as serial cables, USB ports or other connectors. The controller 300 preferably has an auto learn mode 305. This mode 305 is used to place the invention into a mode where current settings/current sensed is stored into memory. The controller also preferably has a host/device mode 306, preferably where the present invention is set as the "master unit" and makes decisions and sends commands to connected devices and/or other control units. The controller 300 preferably has an auxiliary drive 307, e.g. where the present invention can drive devices having a control voltage range of 0-5V DC and a current range from 0-500 mA such as industrial machine indicators, horns or electro-mechanical relays.

Figure 29:
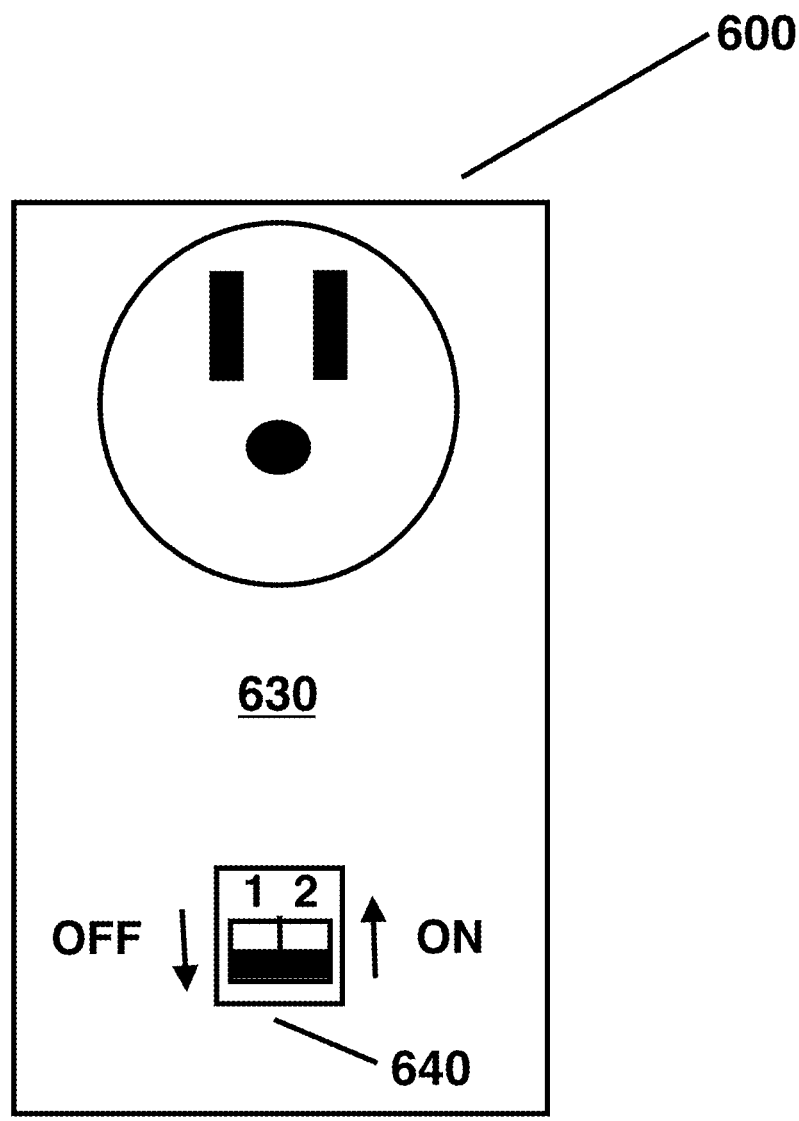
FIG. 29 is a rear view of the embodiment shown in FIG. 1.

Referring now to FIG. 29, a rear view of the embodiment shown in FIG. 1 is shown. The switch 600 preferably has a rear panel 630 with an opening that allows access to a set of dip switches 640. By manipulating the dip switches 640, the user is able to set/control the variables for activation and deactivation of the switch 600. Alternatively, dials, potentiometers or other types of switches can be used in lieu of the dip switches 640. Another alternative is that the variables for switch control, e.g. activation and deactivation, can be entered/saved directly to the MCU unit, e.g. 30 or 300. For example, the variables can be saved in firmware for the MCU unit, e.g. via a serial cable. These variables can be manipulated to account for the variety of primary and secondary devices (and their associated voltages and currents) that can be connected to the switch 600. Thus, if a switch is embedded in a device with known variables, e.g. a known amperage draw, the variables can be more precisely set in software to optimize performance for the specific device.

Figure 16:
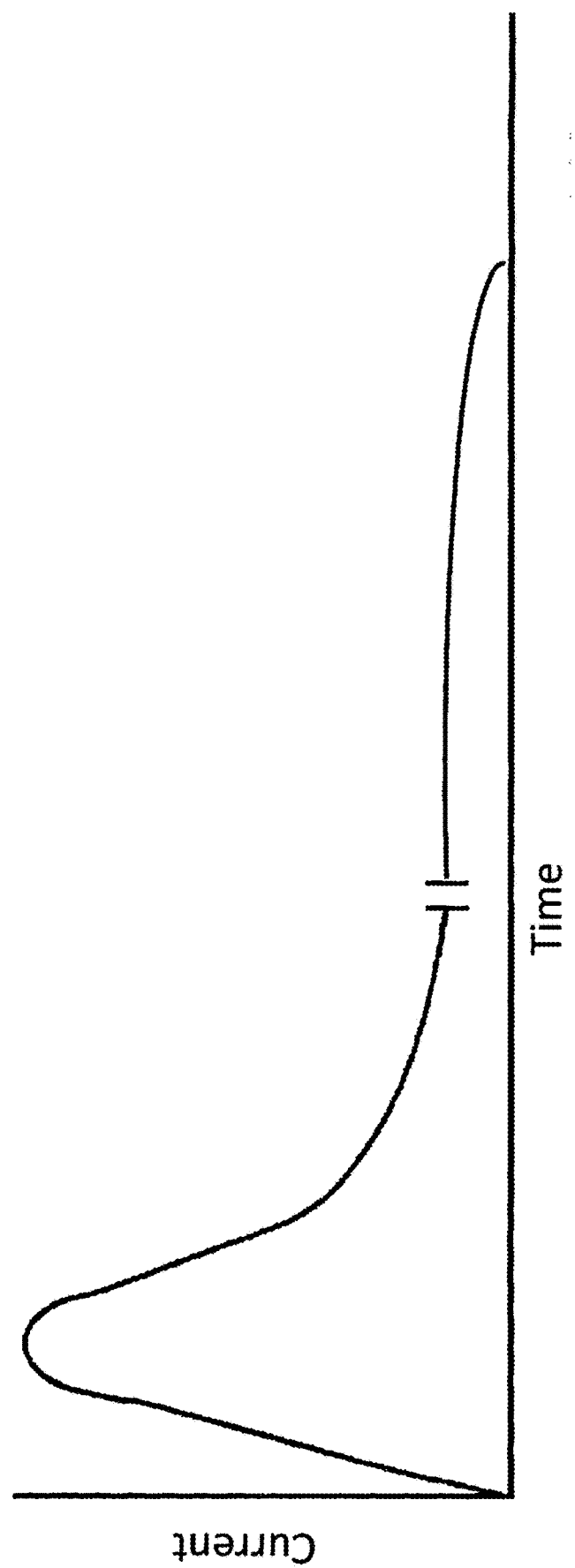
FIG. 16 is a graph of a typical device's current draw over time.
Figure 17:
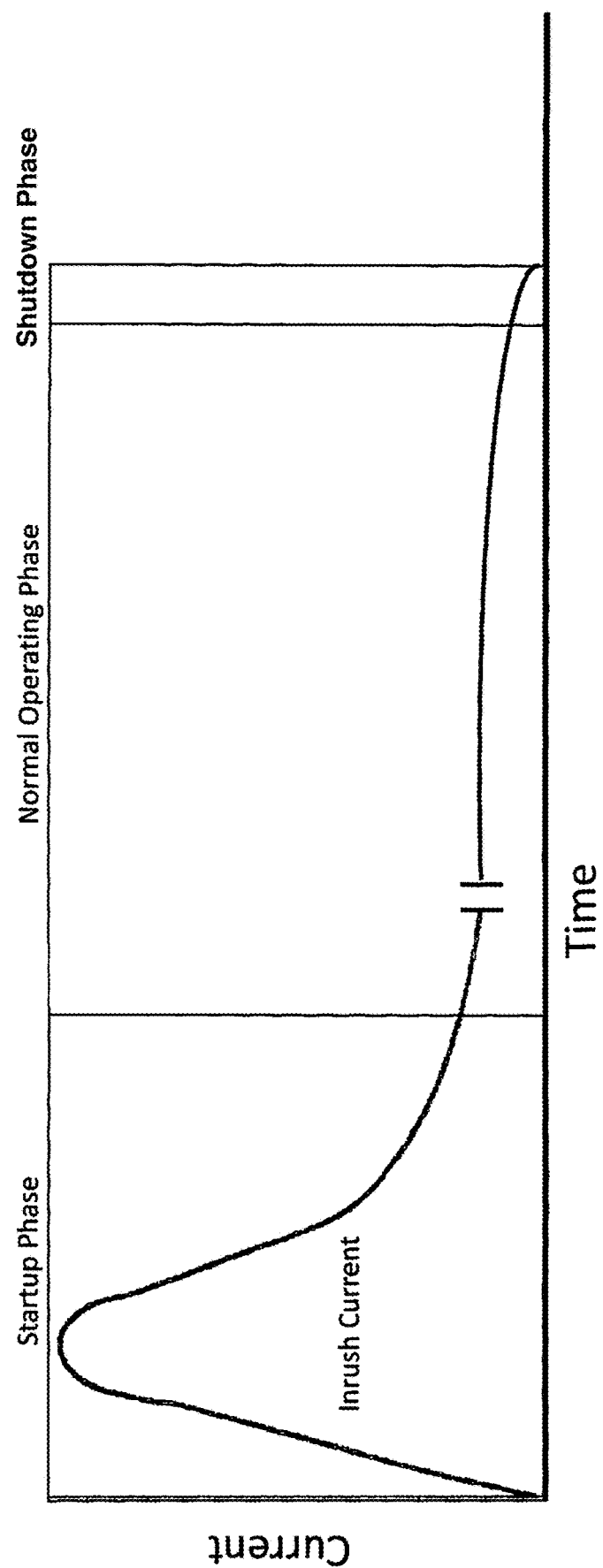
FIG. 17 is the graph from FIG. 16 divided into three phases.

Referring now to FIG. 16, a graph of a typical device's current draw over time is shown. At actuation, the current draw "spikes" upward (also known as "inrush current") and then settles to an "operating current." When the device is shutdown, the current declines to zero. FIG. 17 divides the cycle into different phases: the startup phase, the normal operating phase and the shutdown phase.

Figure 18:
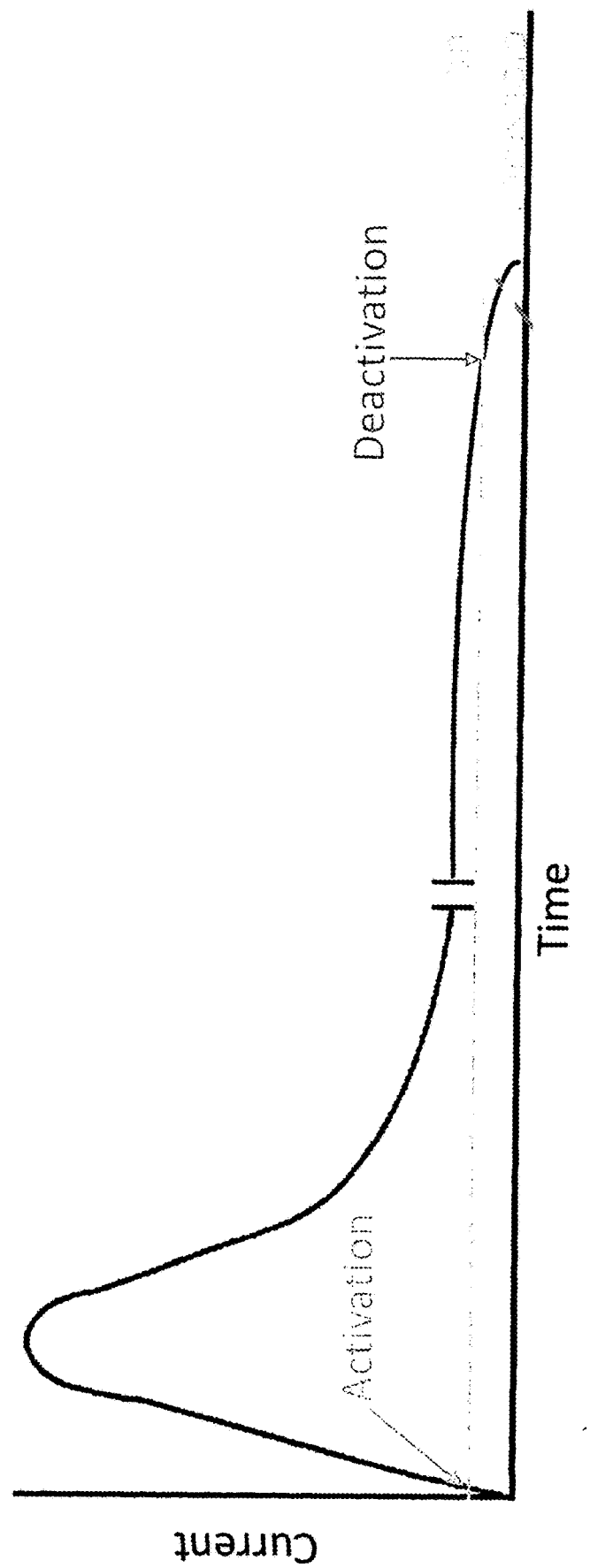
FIG. 18 is a graph showing the actuating level for a device.
Figure 19:
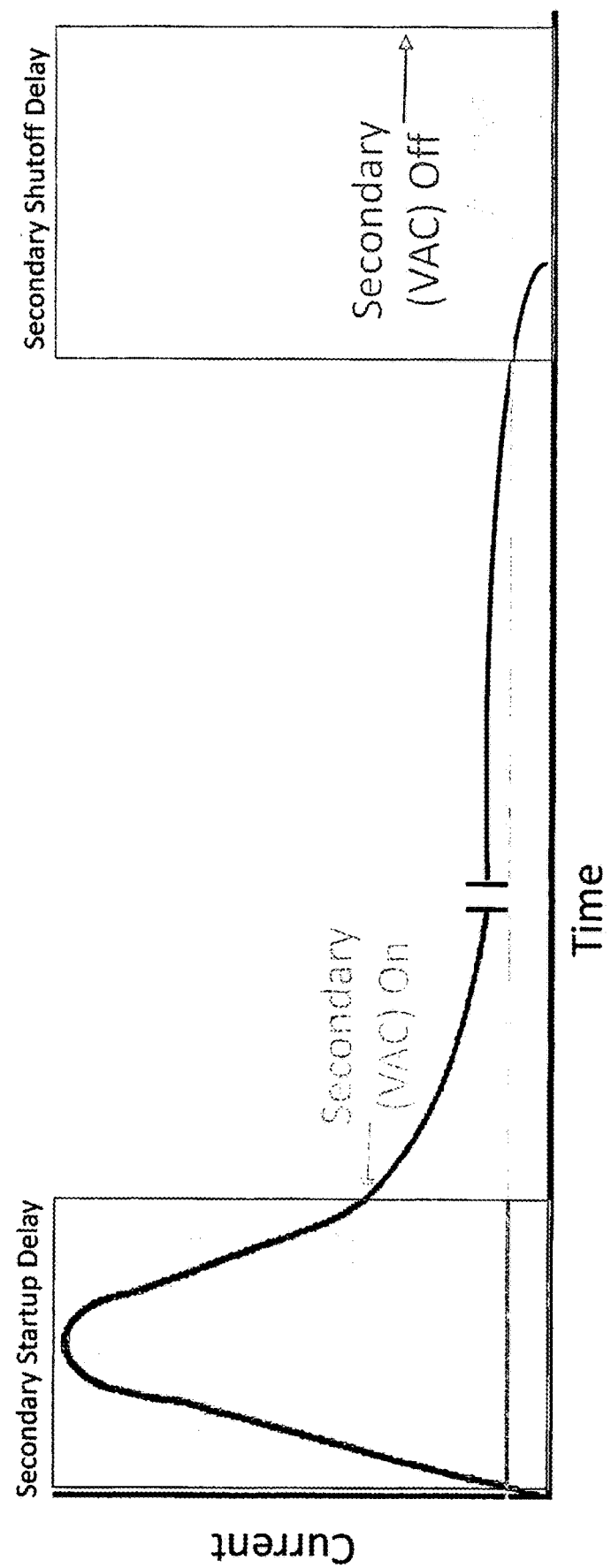
FIG. 19 is a graph showing the secondary startup delay and secondary shut off delay.
Figure 20:
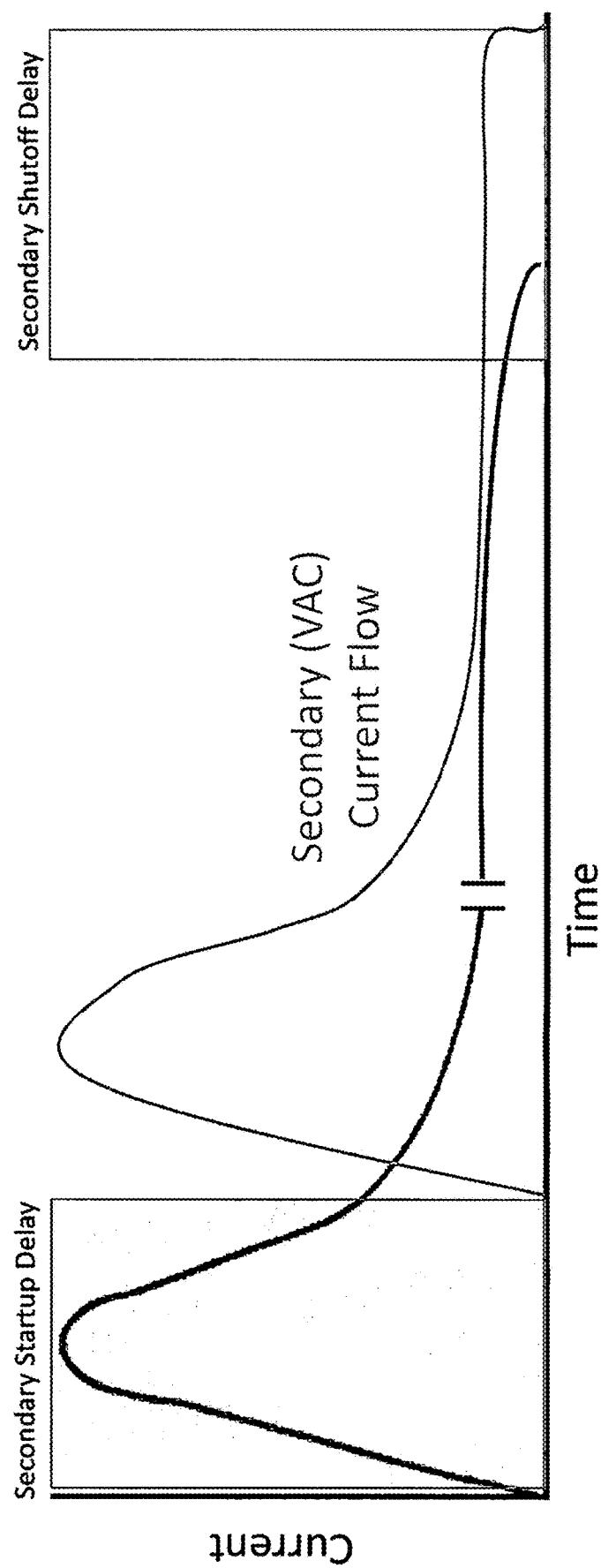
FIG. 20 is a graph showing the current flow for both the primary and secondary devices over time.

One variable that can be used by the switch is "actuation threshold." As shown in FIG. 18, when the current to a device passes a particular level, the switch identifies the connected device as "actuated." Similarly, when the current goes below that actuation threshold, the device is "deactivated." Once the actuation threshold is passed by the primary device, the secondary startup delay begins. As shown in FIG. 19, once the secondary startup delay concludes, the secondary device is activated by the switch (as shown in FIG. 20), thus delaying a current spike from the secondary device and possibly tripping a circuit breaker. Similarly, once the primary device current passes below the actuation threshold, the secondary shutoff delay begins. At the end of the secondary shutoff delay, the secondary device is shutdown. This secondary shutoff delay allows the secondary device, such as a vacuum or ventilation system, to continue to operate while the primary device is shutting down.

Figure 21:
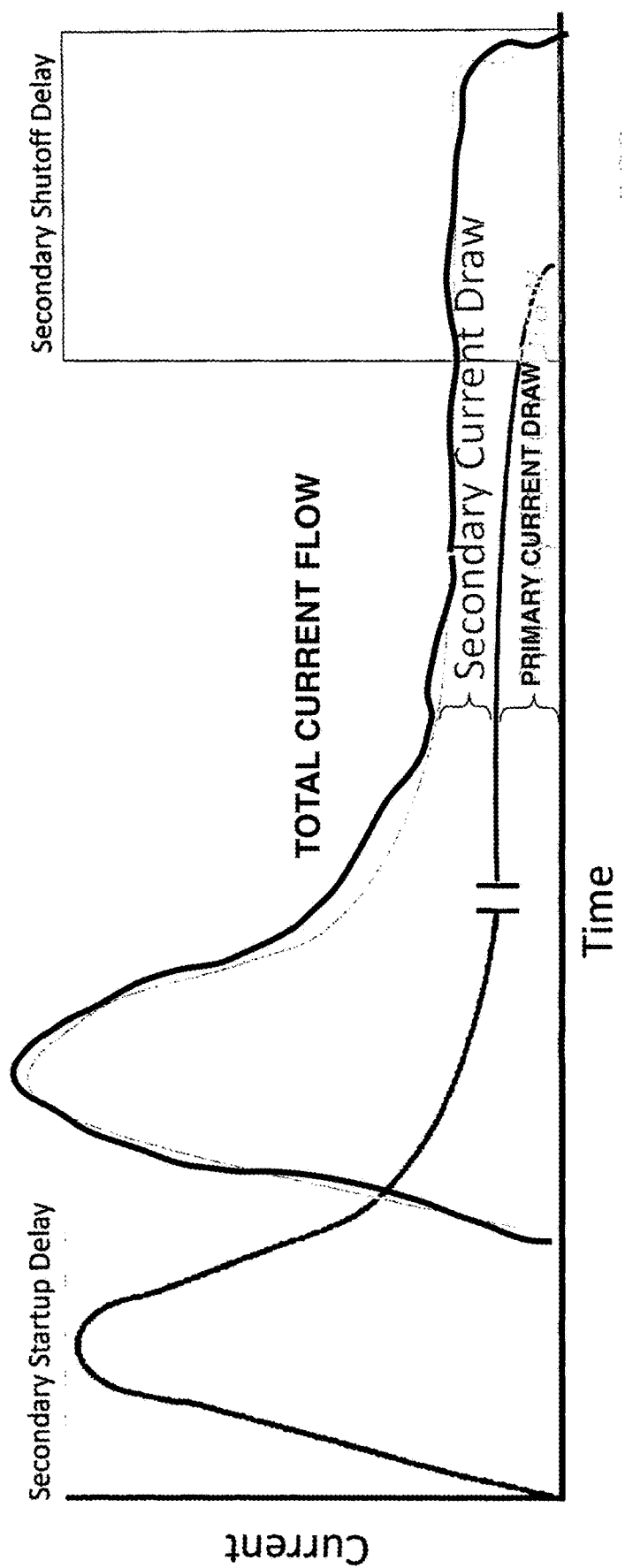
FIG. 21 is graph showing how the actual current draw is calculated.
Figure 22:
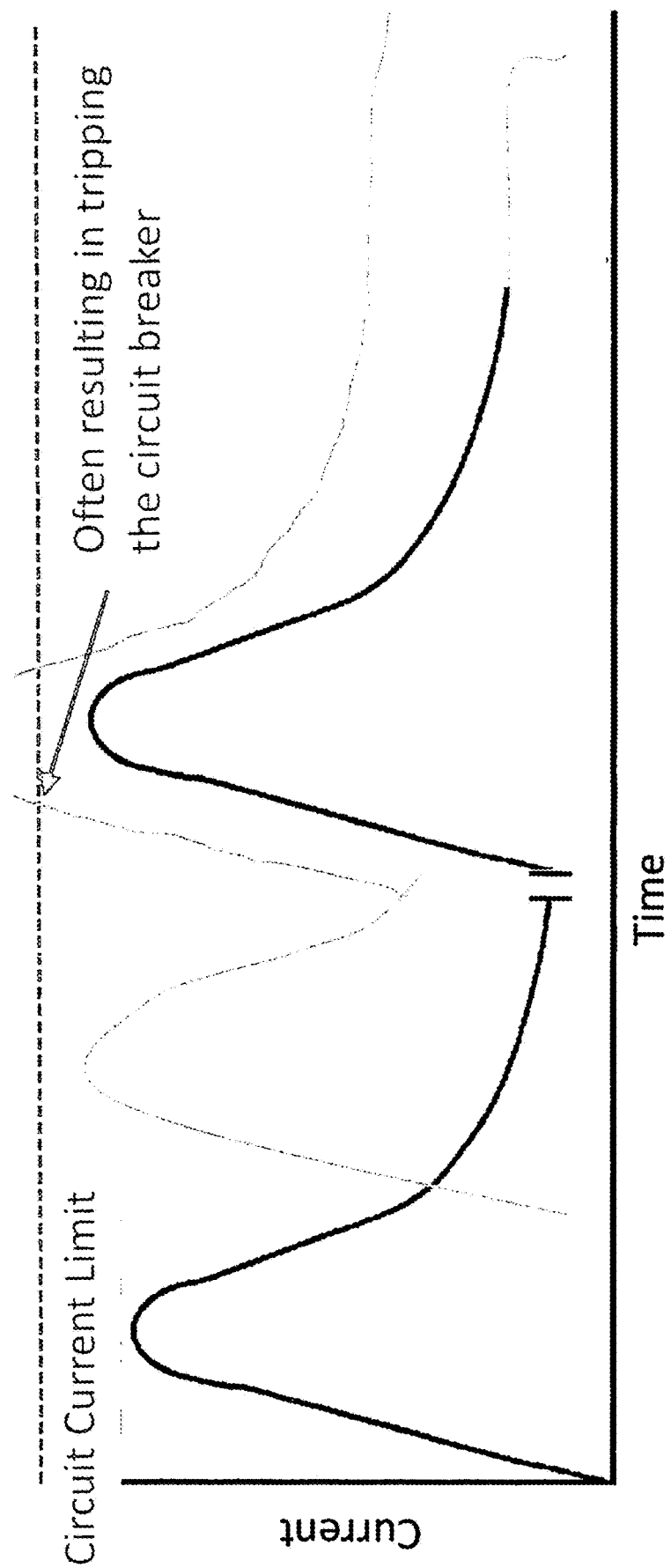
FIG. 22 is a graph showing the current exceeding a circuit breaker limit.
Figure 23:
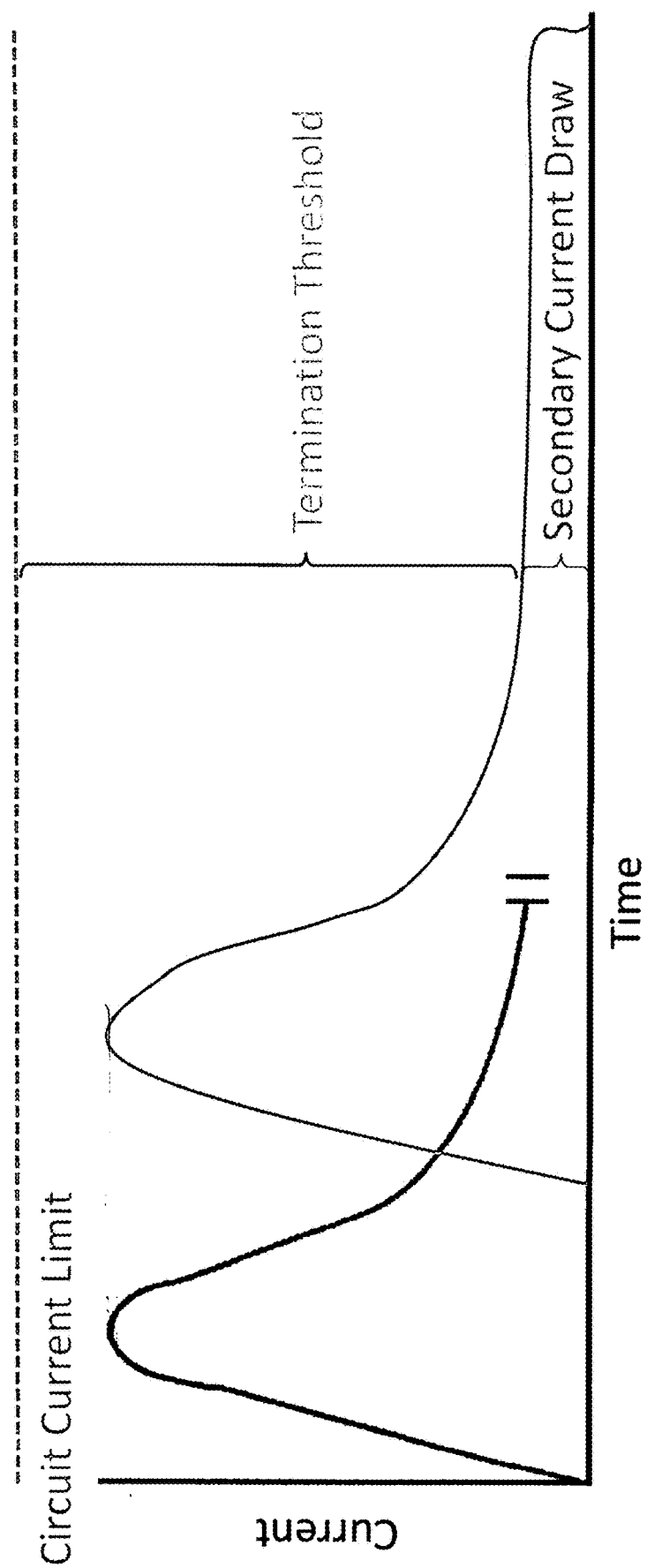
FIG. 23 is a graph showing the calculation of the termination threshold.
Figure 24:
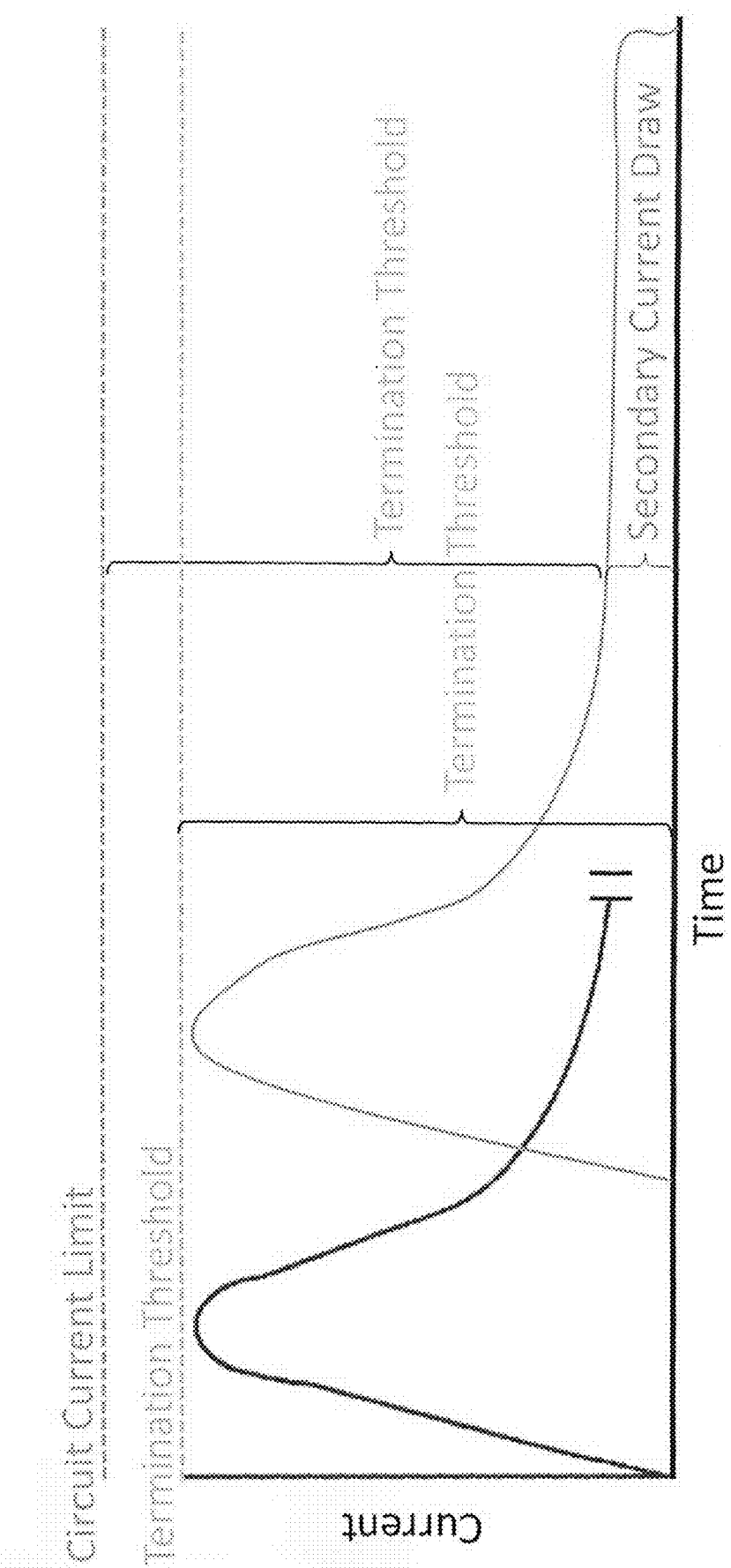
FIG. 24 is a graph showing the termination threshold below the circuit breaker limit.
Figure 25:
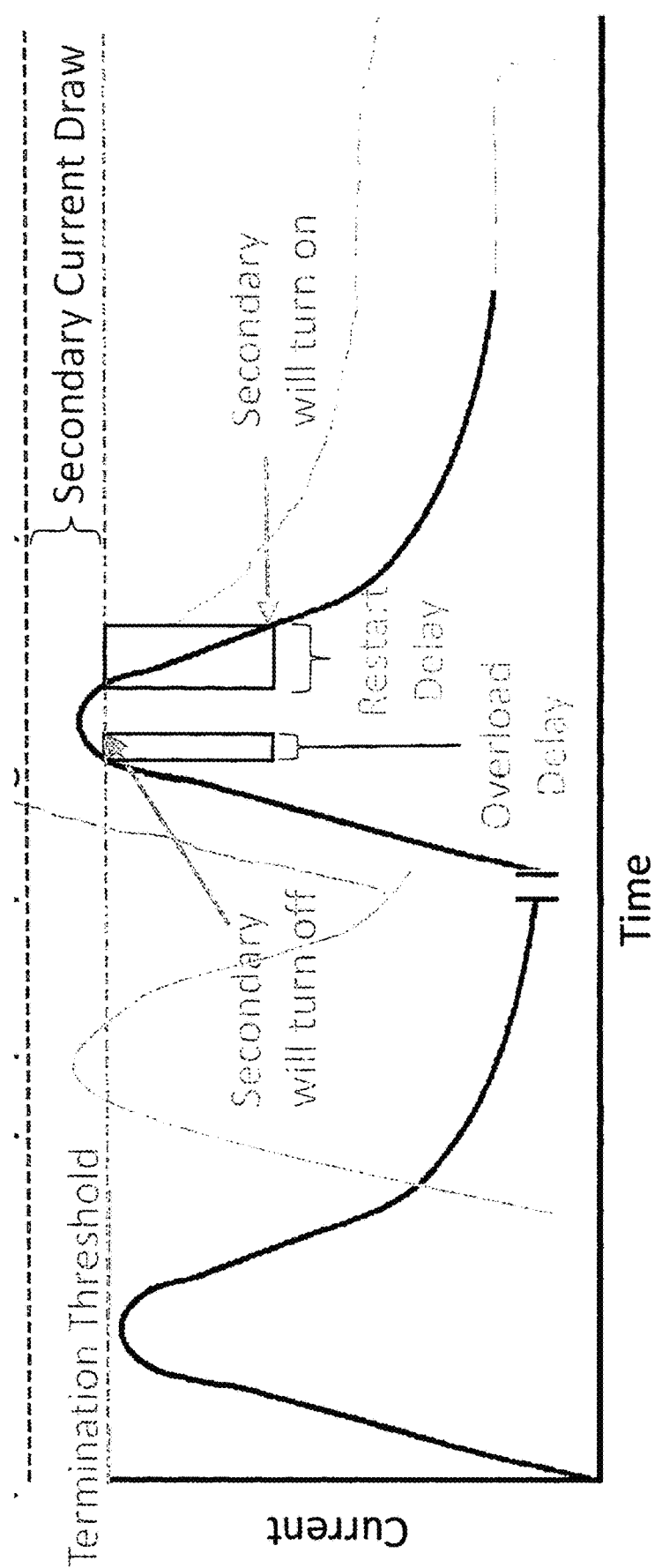
FIG. 25 is a graph showing the shutoff of a secondary device when current exceeds the termination threshold and a restart delay when the current descends below the termination threshold.

Referring now to FIG. 21, the actual current draw during the normal operating phase is the sum of the primary device current draw and the secondary device current draw. However, on occasion, the primary or secondary device can have a current spike. For example, as shown in FIG. 22, the primary device's current can spike, e.g. a saw blade binds, such that when added to the current draw of the secondary device a circuit breaker may be tripped shutting down all current to the switch and devices. However, a termination threshold can be established for the switch based on the standard operating current of the secondary device. The termination threshold is preferably the difference between a circuit breaker limit and the standard operating current of the secondary device (see FIGS. 23 and 24.) Thus, when the actual current draw exceeds the termination threshold, the secondary device can be shutdown before a circuit breaker is tripped. As shown in FIG. 25, once the secondary device is shutdown by the switch and current descends below the termination threshold, a restart delay will occur and then the switch will activate the secondary device again. Thus, the circuit breaker limit can be avoided and operation of the devices can continue without excessive delay.

The variable "termination threshold (TT)" can be described in greater detail as follows. TT is a value of electrical current measured in amps. This value is determined by taking the total current limit of the electrical circuit where the present invention is used and subtracting the normal operating current of a secondary device, e.g. a shop vacuum. Thus, the termination threshold is the total amount of current available that a primary device, e.g. a table saw, could draw from the circuit while the secondary device is running without exceeding the total current limit of the electrical circuit.

There are several ways to set the TT value for the present invention. One embodiment allows for manual adjustment. For example, using variable rotation switches, the user can set the value of the operating current of a secondary device as well as a separate switch to set the value of the current limit of the electrical circuit (usually 20 amps.) Software in the present invention used by the MCU can then calculate the TT value as the circuit limit less the secondary device operating current level.

Another embodiment allows for manual adjustment as well. Using variable rotation switches, the user can set the TT value for the present invention directly, which would be determined by having the user perform the calculation described above (electrical circuit limit less operating current of the secondary device.)

Another embodiment allows for semi-automatic adjustment of the TT value. After setting the electrical circuit limit (preferably a default 20 amps), the user would put the present invention into a "programming" mode, e.g. by depressing a switch or by other method. Once in the programming mode, the user would plug the secondary device into the primary port and turn the secondary device on. The present invention would then measure the current draw of the secondary device and, after a pre-determined time or a continued measurement of the same current draw level (which would indicate that the stabilized operating current level had been reached), the present invention would calculate the TT value (by subtracting the measured secondary current level from the electrical circuit limit) and store this value and indicate that the programming mode is completed (e.g., by changing an LED from blinking red to green). If the user wants to use a new or different secondary device, the user would put the present invention back into programming mode and repeat this procedure to store a new value in memory.

Another embodiment would allow for a fully automatic setting of the TT value. This embodiment would have a default current limit of 15 amps. This embodiment would then measure the current draw of both a primary device and a secondary device. When the combined currents of the two devices exceed the current limit, the secondary device would shut off for a pre-determined amount of time and then restart. The user would be able to adjust the current limit by, for example, turning dip switches or rotary switches to allow settings between 10 and 20 amps or between 15 and 25 amps. This would allow the user to match the settings to the particularities of their own electrical circuit and equipment. In this embodiment, the TT value is a dynamic value rather than a stored value and it is determined by subtracting the current draw of the secondary device from the total current limit set for the invention. This can also operate by tracking the total current draw of both devices and comparing this value against the total current limit.

The TT value is used to allow the present invention to selectively turn off the secondary device when the current draw of the primary device exceeds the TT value and therefore avoid overloading of the electrical circuit/tripping the circuit breaker. The current draw of a primary device can spike for a number of reasons, such as when a saw blade binds up against wet or green wood. By turning off a secondary device in this situation, the primary device has the full amount of current available on the electrical circuit to preferably "power through" the cause of the spike (or at least provide the user with the ability to stop the primary device and restart it)—without causing the circuit breaker to trip, which would require the user to go to the electrical panel and reset the circuit breaker.

Other variables can be detected and used by the present invention. For example, "Total Current Limit" is the amount of current flowing through the invention (to both the primary and secondary devices) and is measured by using two current-sensing transformers.

"Overload Delay" is the amount of buffer time during which a primary device is allowed to exceed TT before a secondary device is shut off. Circuit breakers typically have their own internal buffer and the Overload Delay could have a similar buffer to allow for short current spikes that would not trip the circuit breaker. This is an optional variable and is not required, e.g. the Overload Delay can be set to zero—meaning a secondary device will shut off immediately once the current draw of a primary device reaches the TT value.

Another variable that can be detected and used by the present invention is "Restart Delay." Restart Delay is the amount of waiting time that will elapse after the current draw of a primary device has dropped back to/below the TT value before turning a secondary device back on. The primary reason for Restart Delay is to allow the current level of a primary device to drop down enough so that the inrush current level spike created when turning a secondary device back on will not exceed the circuit level and trip the circuit breaker. This option is a preferred method for determining when a secondary device will turn back on.

Another variable that can be detected and used by the present invention is "Restart Current Level." Restart Current Level is a different current level that a primary device must drop to before a secondary device will turn back on. The Restart Current Level is TT less an additional amount of current. This allows a current spike when a secondary device is turned on to avoid tripping a circuit breaker. This is another option in lieu of the Restart Delay described above.

Restart Delay and Restart Current Level can be used together such that the current draw of a primary device would have to drop to or below the Restart Current Level and then, after the Restart Delay, a secondary device could restart.

The programming mode of the present invention described above would allow a user to measure and capture the inrush current level of a secondary device, e.g. a shop vacuum, as well as the stabilized operating current. With the inrush current level determined, the present invention could set the Restart Current Level as the TT value less the inrush current level of a secondary device. This would be a preferred way to allow for difference between inrush current levels of various secondary devices.

One embodiment that uses the Termination Threshold variable would preferably be static in nature. Accordingly, the available amperage for a primary device is set (and preferably stored in memory). Such a setting can be done in a variety of ways but basically the normal operating current of a secondary device is deducted from the overall circuit limit and this leaves the available power tool current. This option will preferably be used when the present invention is integrated into a device as the operating characteristics of the device (e.g. a shop vacuum) will be known and established so it can be stored in memory on the present invention.

Another embodiment that uses the Termination Threshold variable would preferably be dynamic in nature. Accordingly, the amperages of both a primary device and a secondary device are read and monitored continuously by the present invention. When the combined amperage of both devices exceeds the overall circuit limit (within certain tolerances), then the secondary device is shut down until there is enough available current to run it (the "normal operating current" levels of both the primary and secondary devices can be established dynamically each time the device is used or as described above).

Another embodiment of the invention preferably has a safe restart function. The function prevents a tool, or any other electrical device that is plugged into the primary output of the invention, from starting up inadvertently if the tool was left ON and there was a power failure. Some tools have locking ON switches (such as routers and table saws) and the safe restart function will provide additional safety to users by preventing such tools plugged into the primary output of the invention from restarting automatically after the resumption of power after a power failure, thus avoiding potential injury.

The invention described above has sensitive current measuring capabilities and also the ability to react quickly to various inputs due to the presence of microprocessor or MCU. The embodiment with safe restart function preferably uses additional software and a second relay on the primary output circuit, e.g. where the TOOL is energized. The software preferably runs an initial "Safe Restart Safety" function each time the invention is powered on. This function preferably measures the amount of current flowing to the primary output and, if any current is detected (which would indicate the TOOL is switched on), then the primary output will be turned off (by opening up the TOOL relay). This safe restart function will happen nearly "instantaneously"—preventing enough current to flow to the tool to actually turn on the tool itself. In this application, "instantaneously" is preferably less than 1 millisecond (ms). The TOOL or primary output relay will remain open until the invention is re-energized (at which point the safe restart function will run again). An optional indicator light on the invention can show the user (e.g. a flashing LED) if the primary output is "ON."

There are at least three (3) ways for the invention to resolve the safe restart open relay condition:

1) The invention runs a continuous loop in the software for some predetermined period (e.g. every 8.33 milliseconds) and, once no current draw is detected from the tool, the MCU will close the relay and power will flow to the tool. This safe restart function is only run when the invention is first energized so it will not repeat the function as long as the invention remains energized once it has successfully passed the safe restart test/function;

2) The user unplugs the invention from a power source and then plugs it back into a power source if the safe restart function has opened up the relay that powers the TOOL; or, 3) The invention also preferably has a "reset" button to allow the safe restart function to be run without requiring the invention to be unplugged from a power source.

Figure 28:
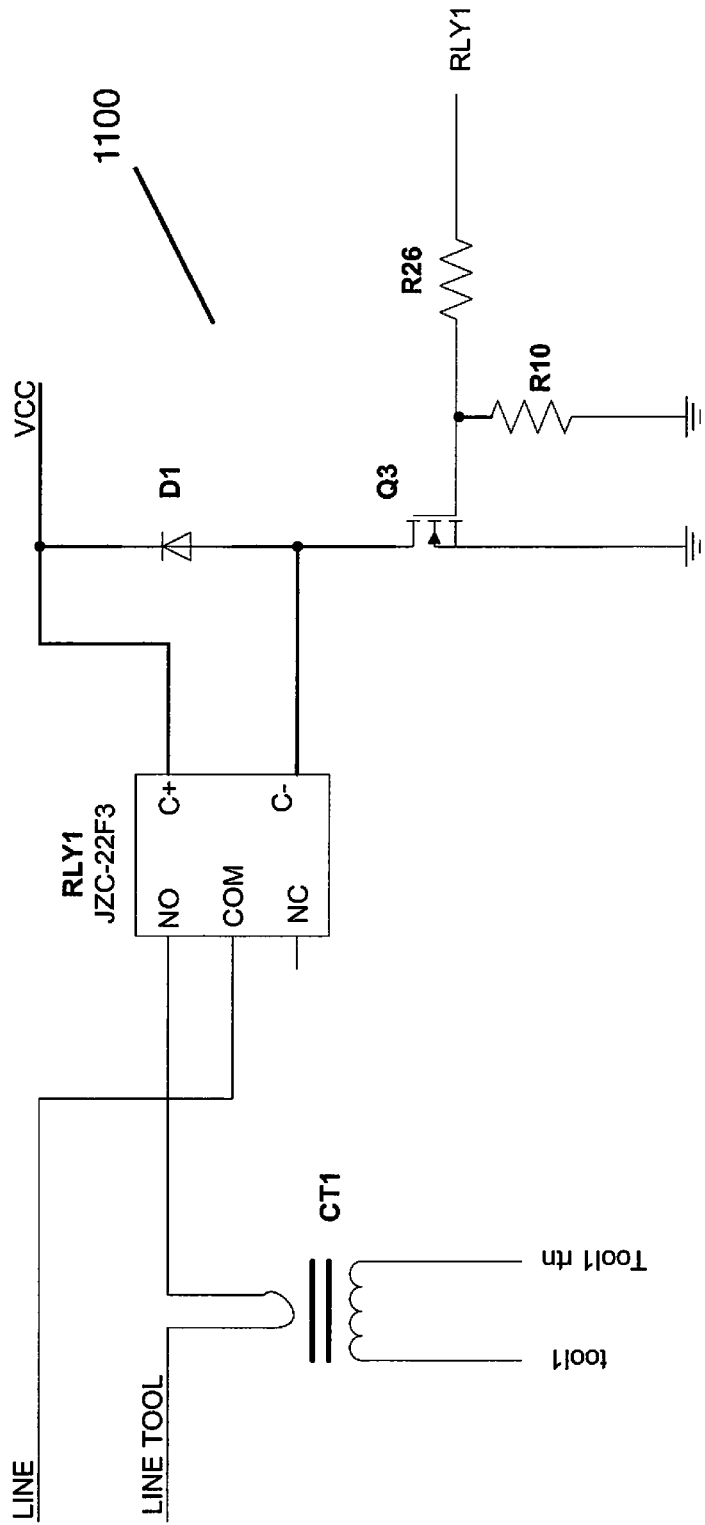
FIG. 28 is a circuit diagram of a preferred embodiment of a circuit for a safe restart function.

Referring now to FIG. 28, a preferred embodiment of the circuit for the second relay for the safe restart function is shown. The safe restart function can also operate independently from the invention described above. For example, a wireless version of the invention can have separate plug-in modules for tools connected to the primary output of the invention and for devices connected to the secondary output (e.g. VAC). The safe restart function in either module functions separately from the invention to shut down the primary (TOOL) and/or secondary (VAC) outputs when connected devices are left "ON".

Figure 26:
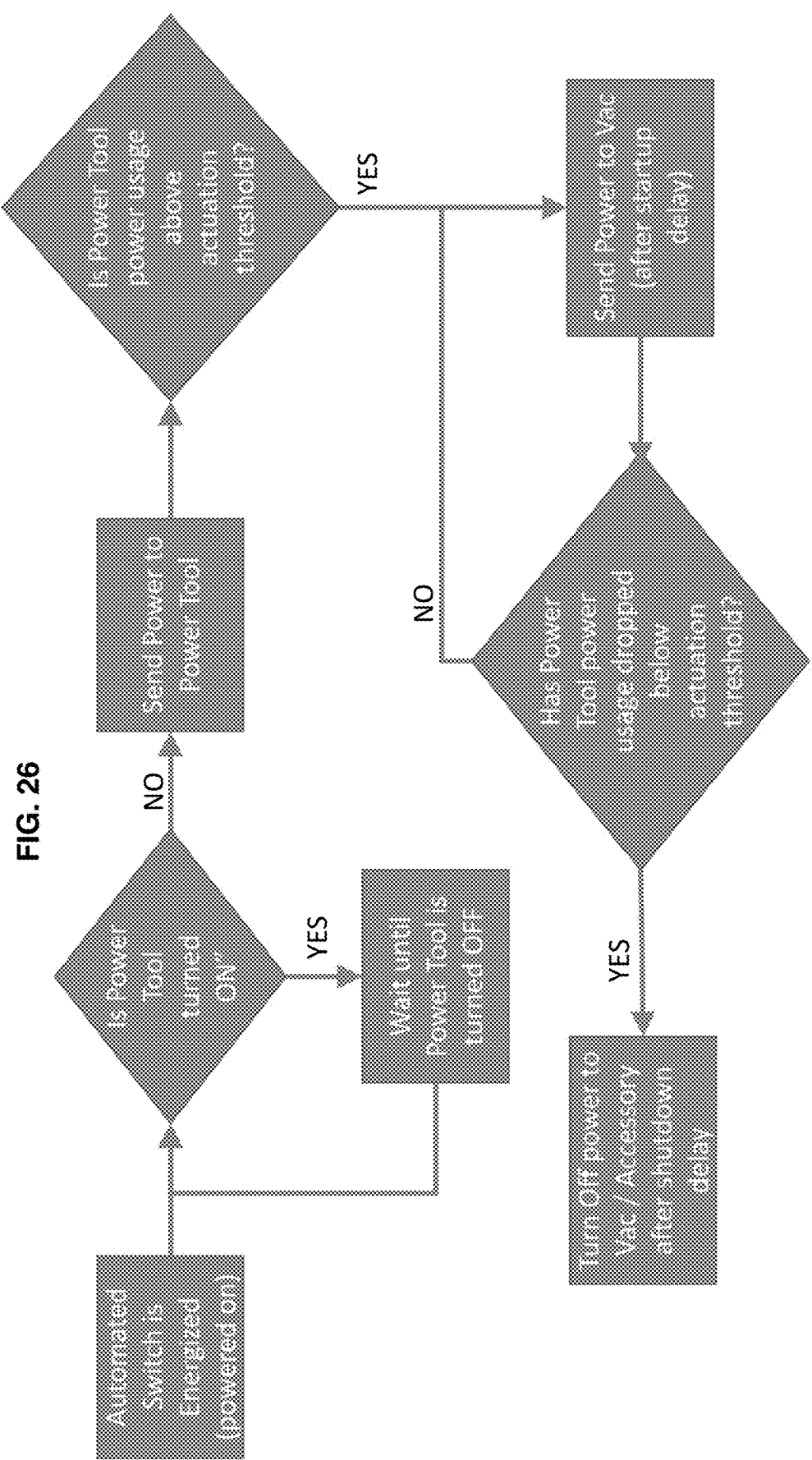
FIG. 26 is a flow chart showing operation of a preferred embodiment.
Figure 27:
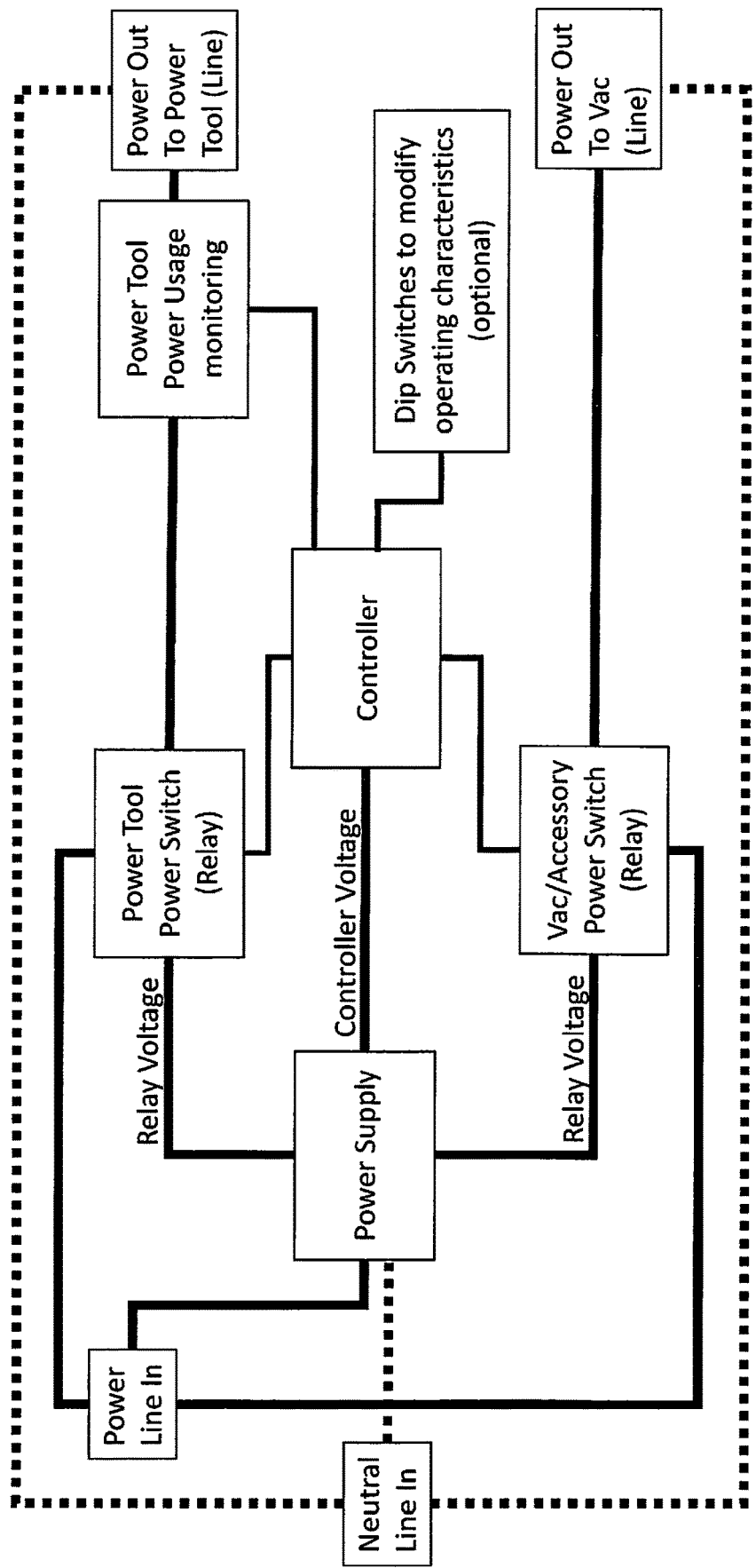
FIG. 27 is a schematic overview of a preferred embodiment.

Referring now to FIG. 26, an operational flowchart for the invention is shown proceeding from when the device is "powered on" to when the VAC/accessory is shut down after a delay. Referring now to FIG. 27, a schematic overview of a preferred embodiment of the invention is shown.

Figure 30C:
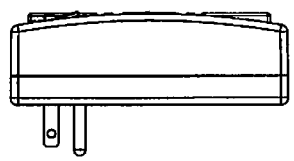
FIG. 30C is a side view of the embodiment in FIG. 30A.
Figure 30B:
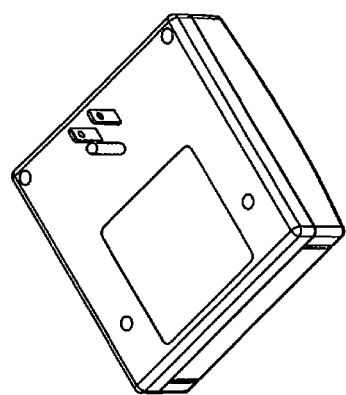
FIG. 30B is a rear perspective view of the embodiment in FIG. 30A.
Figure 30A:
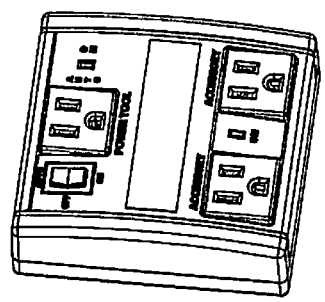
FIG. 30A is a front perspective view of an alternative embodiment of the present invention.
Figure 31:
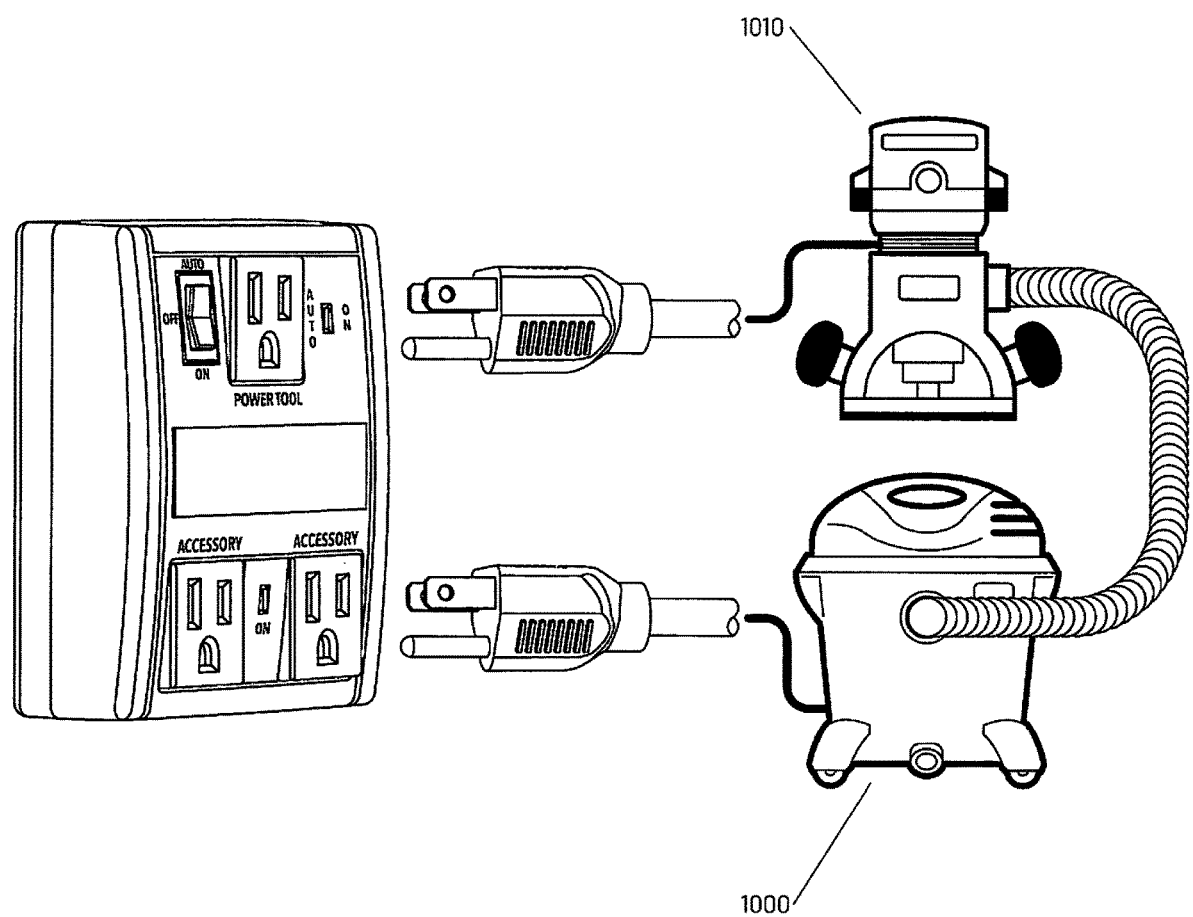
FIG. 31 is a perspective view of the embodiment in FIG. 30A in use.

The circuits described above allow for a number of embodiments of the invention. Referring now to FIGS. 30A, 30B and 30C, a plug-in stand-alone embodiment with two accessory outlets is shown. FIG. 31 shows an exemplary use of the embodiment in FIGS. 30A-30C.

Figure 32:
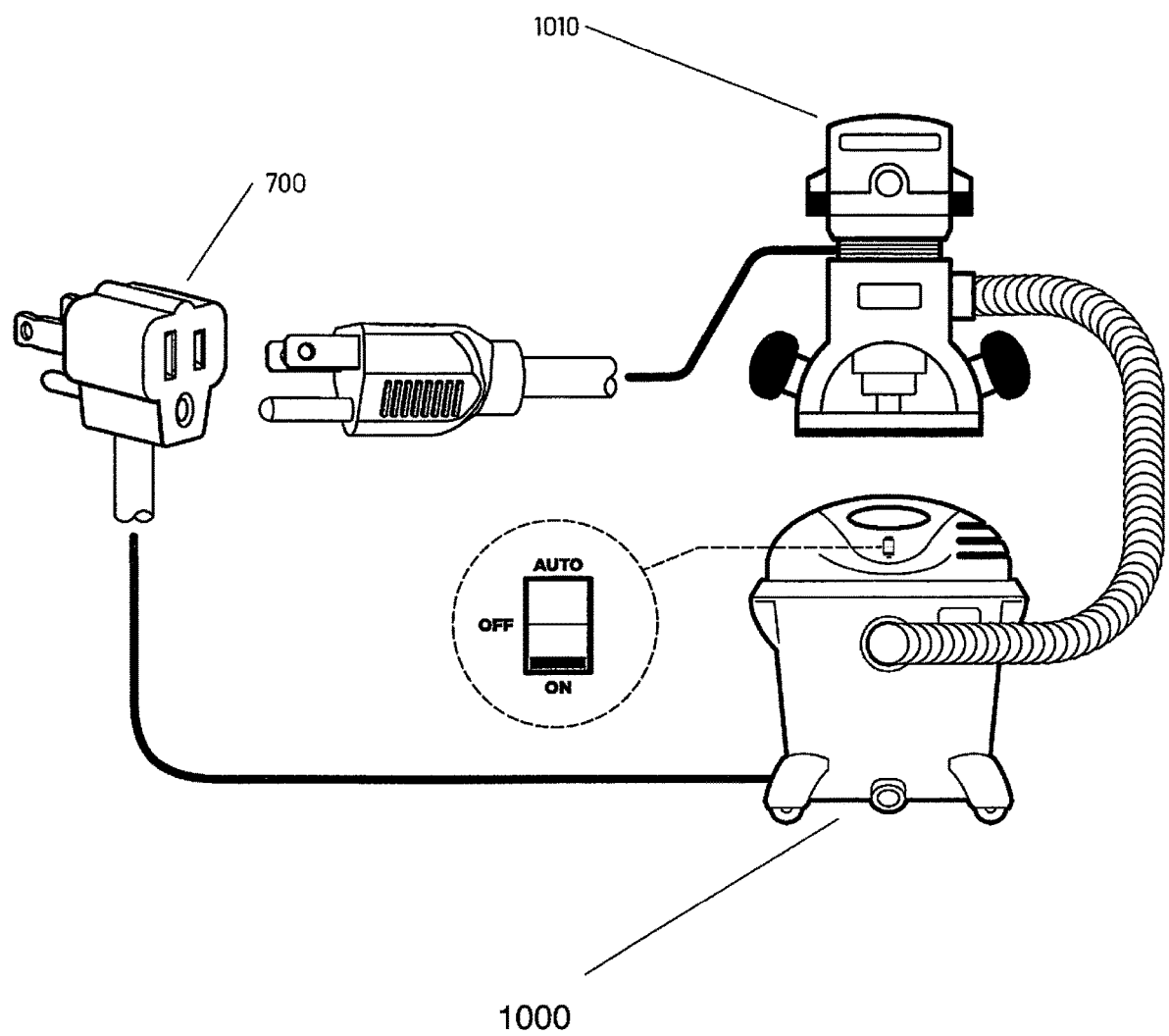
FIG. 32 is a perspective view of an alternative embodiment of the present invention.
Figure 33:
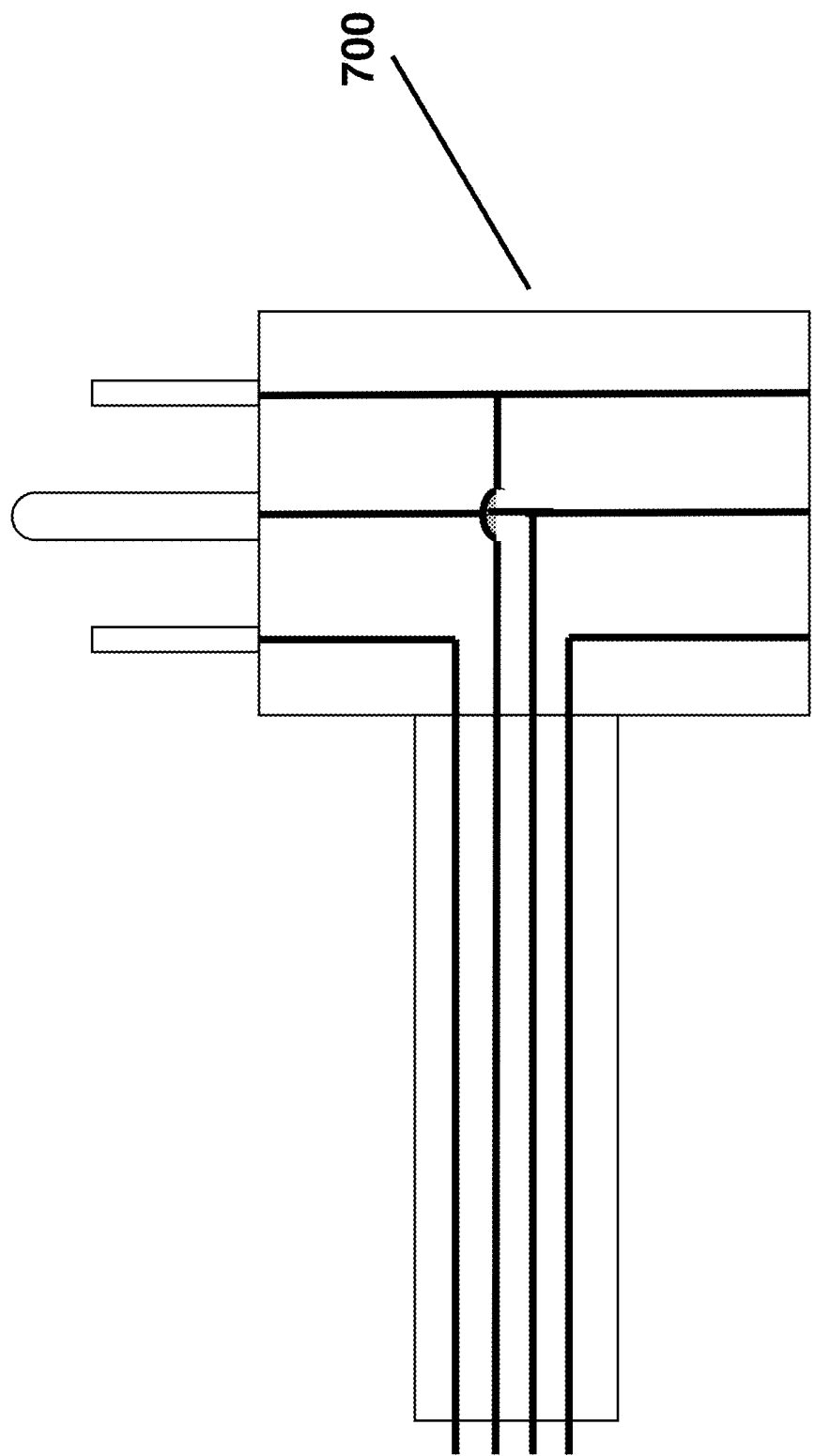
FIG. 33 is a schematic view of the piggy-back plug portion of the embodiment shown in FIG. 32.

Referring now to FIG. 32, an alternative embodiment using a "piggy back" plug is shown. In FIG. 32, the switch circuit described above is located in the VAC 1000 and terminates in the "piggy back" plug 700. The main device 1010 plugs into the plug 700 which is inserted into the main AC power supply. The circuitry in VAC 1000 then controls both the VAC 1000 and the main device 1010 as described above. FIG. 33 shows a preferred embodiment of the plug 700.

Figure 34:
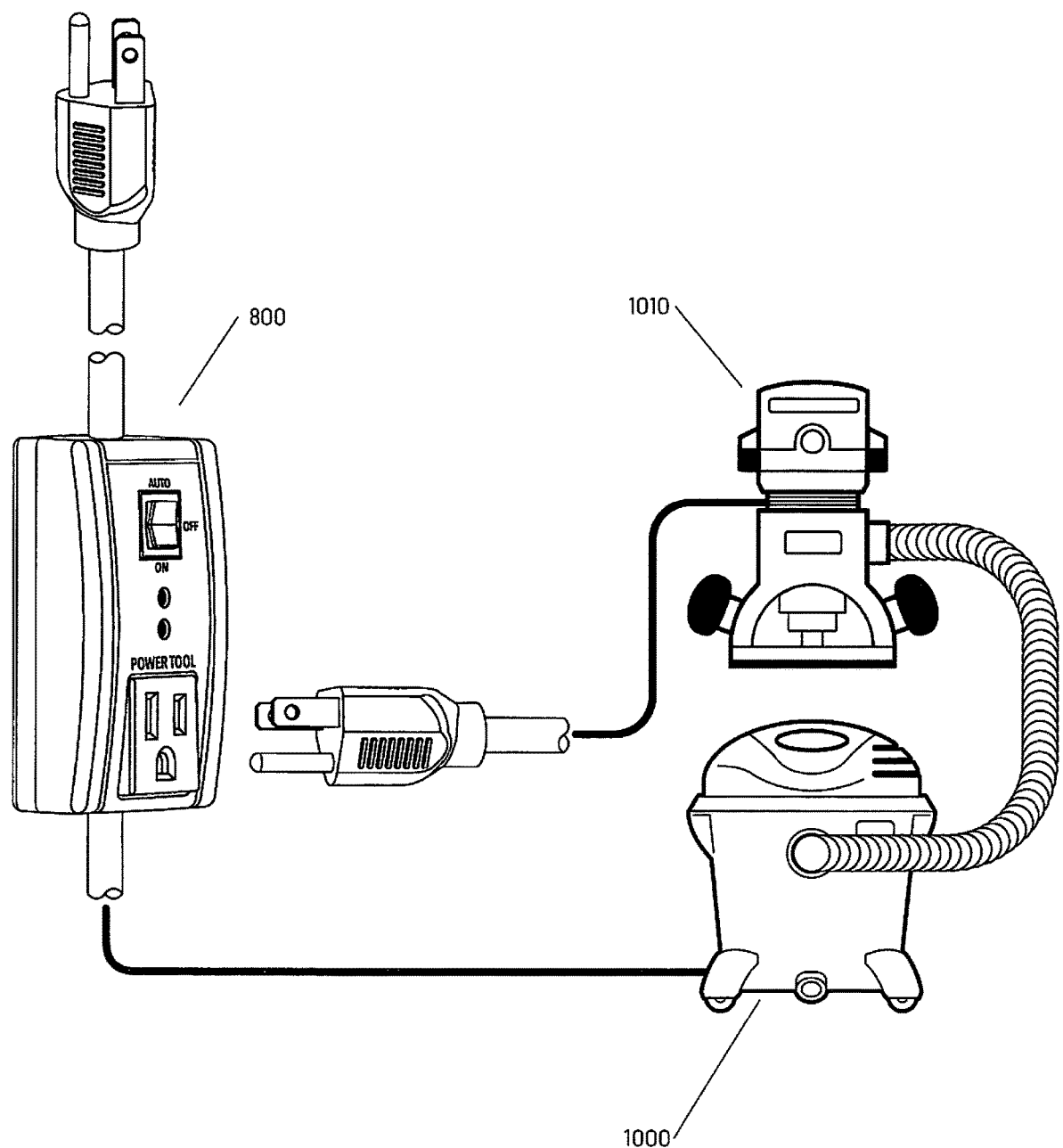
FIG. 34 is a perspective view of an alternative embodiment of the present invention installed on the power cord of an accessory device.
Figure 35:
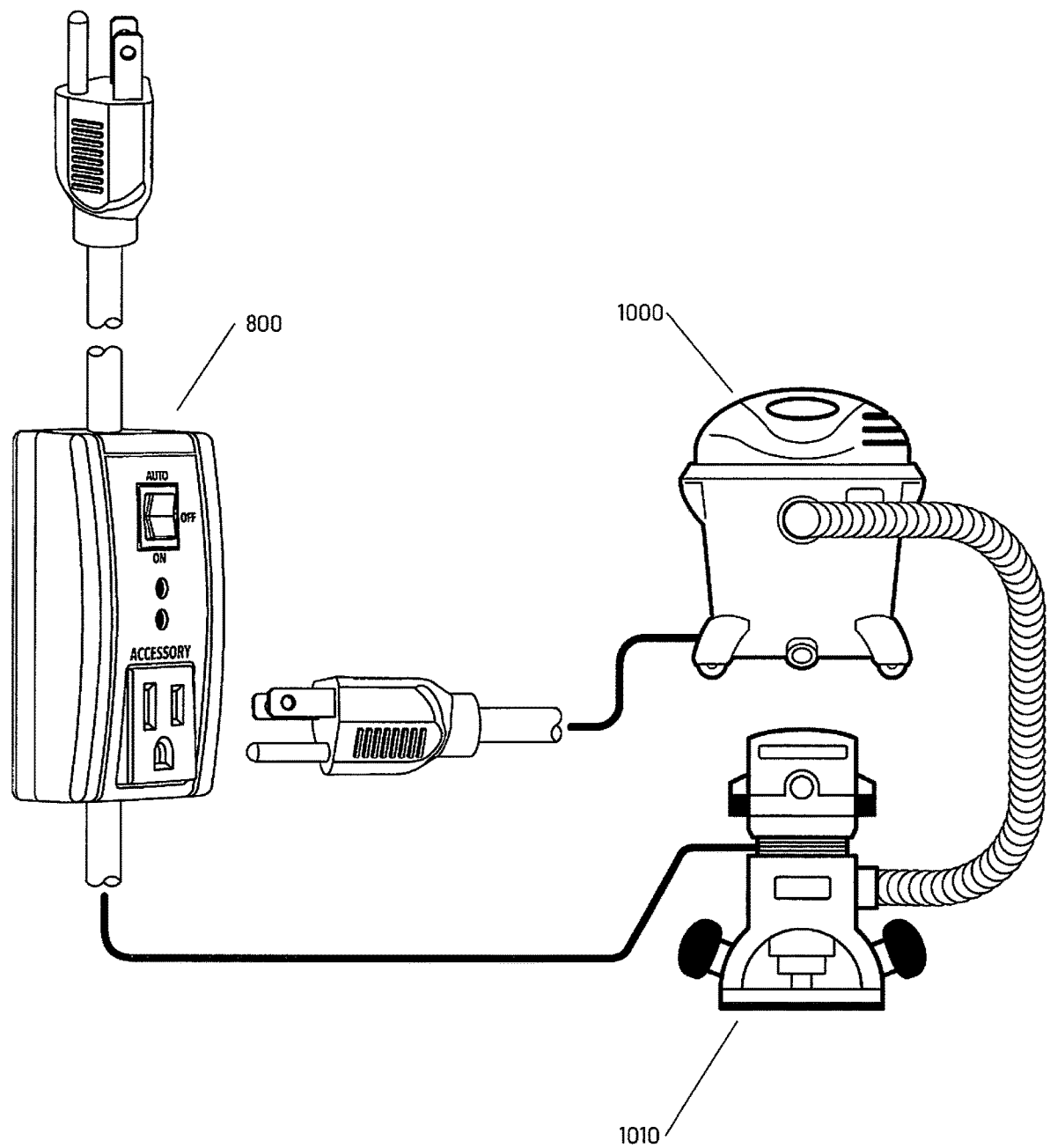
FIG. 35 is a perspective view of an alternative embodiment of the present invention installed on the power cord of a main device.

Referring now to FIG. 34, another alternative embodiment is shown where the switch described above is attached to an external power cord sheath 800 on the VAC/accessory device 1000. The invention is contained in the sheath 800 on the power cord for the accessory device 1000. The main device 1010 is then plugged into the sheath 800 and controlled thereby. Currents in the power cord of the VAC 1000 are preferably read by Hall effect sensors in the sheath 800. Alternately, an embodiment can be configured such that the sheath 800 can be placed on the power cord of the main device 1010 and the accessory 1000 can be plugged into the sheath 800 in turn as shown in FIG. 35.

Figure 36:
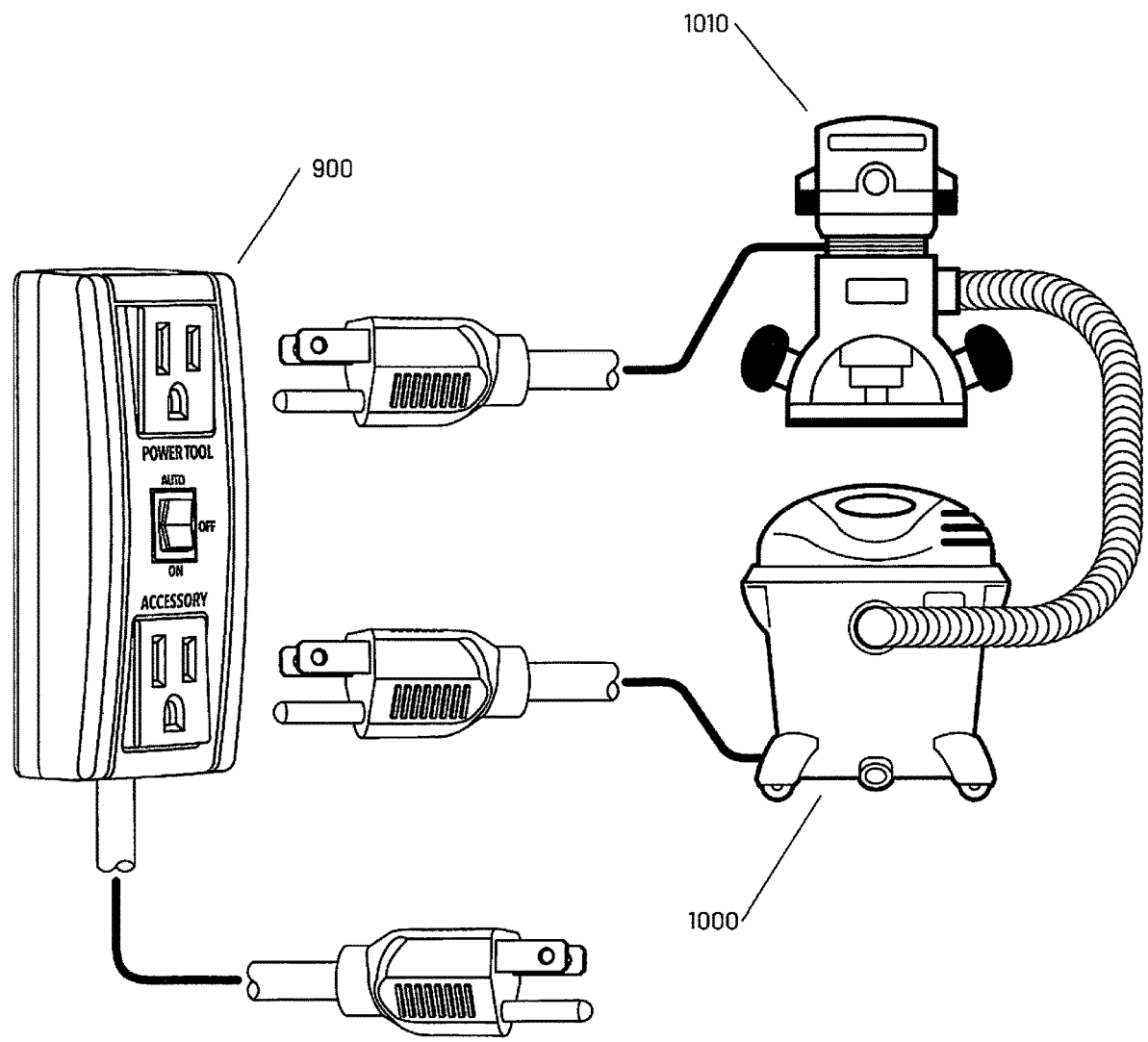
FIG. 36 is another alternative embodiment of the present invention.

Referring now to FIG. 36, a preferred embodiment of a corded stand-alone version 900 of the invention is shown. The device 900 is plugged into the AC power supply (not shown) and the accessory 1000 and main device 1010 are plugged into the device 900 housing the circuitry described above to control both devices in turn.

Figure 37:
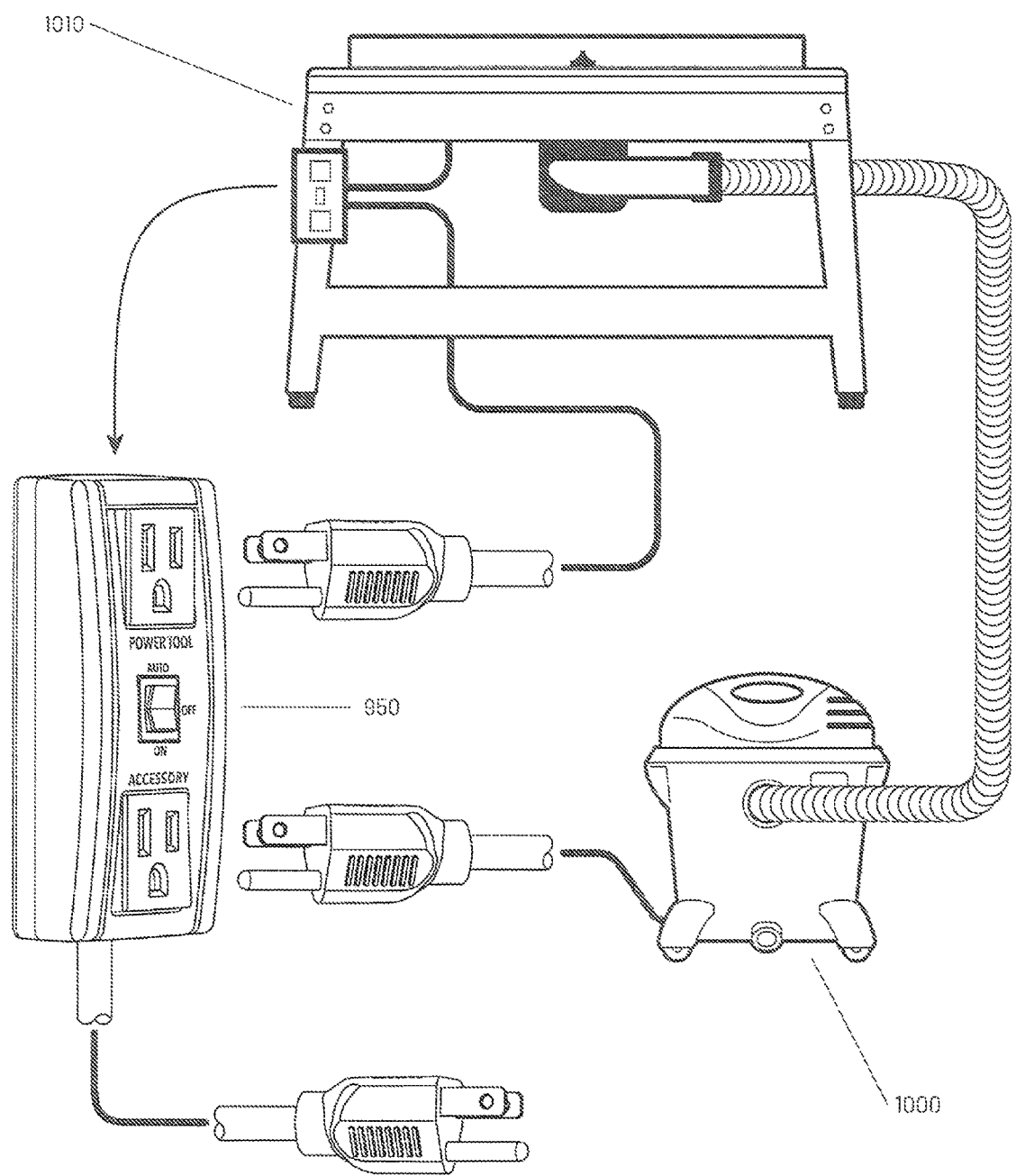
FIG. 37 is another alternative embodiment of the present invention.

Referring now to FIG. 37, another alternative embodiment is shown where the circuit described above is housed in a safety switch 950 mounted on the main device 1010.

The main device 1010 is plugged into the switch 950 and the accessory/VAC 1000 is plugged into the switch 950.

Thus, a variable control switch is described above. In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A control switch comprising:
   an input having two input terminals;
   a first output having two contacts, wherein a first input terminal of said two input terminals is connected to a first of said two contacts of the first output;
   a second output having two contacts, wherein the first input terminal of said two input terminals is connected to said first of said two contacts of the second output;
   where the input is connected to the first output by an optocoupler where the optocoupler is in parallel to the input;

a sensing circuit, comprising a first connection to a second terminal of said two input terminals, and a second connection to the second of said two contacts of said first output, and an output comprising a direct-current (DC) voltage varying proportionally with a current passing between said first and second connections; and, a microcontroller unit that controls currents to the first and second outputs based on a set of pre-determined variables;

where the set of pre-determined variables includes a normal operating current for the second output set by inputs on the control switch or stored in a memory on the microcontroller unit.

2. A control switch comprising:

an input having two input terminals;

a first output having two contacts, wherein a first input terminal of said two input terminals is connected to a first of said two contacts of the first output;

a second output having two contacts, wherein the first input terminal of said two input terminals is connected to said first of said two contacts of the second output;

where the input is connected to the first output by an optocoupler where the optocoupler is in parallel to the input;

a sensing circuit, comprising a first connection to a second terminal of said two input terminals, and a second connection to the second of said two contacts of said first output, and an output comprising a direct-current (DC) voltage varying proportionally with a current passing between said first and second connections; and, a microcontroller unit that controls currents to the first and second outputs based on a set of pre-determined variables.

3. A control switch comprising:

a power input connected to a microcontroller unit for a primary device relay and a secondary device relay;

said microcontroller unit connected to a current sensing component and a voltage sensing component, where the voltage sensing component comprises an optocoupler where the optocoupler is configured as a shunt for the primary device relay and isolates the voltage sensing component from the power input;

where said microcontroller controls voltage and current outputs of the primary device relay and the secondary device relay and where the primary device relay has a primary device power output and the secondary device relay has a secondary device power output.

4. A control switch comprising:

a power input connected to a microcontroller unit for a primary device relay and a secondary device relay;

said microcontroller unit connected to a current sensing component and a voltage sensing component, where the voltage sensing component comprises an optocoupler where the optocoupler is configured as a parallel device for the primary device relay and isolates the voltage sensing component from the power input;

where said microcontroller controls voltage and current outputs of the primary device relay and the secondary device relay and where the primary device relay has a primary device power output and the secondary device relay has a secondary device power output.

\* \* \* \* \*